(12) United States Patent
Shinohara et al.

(10) Patent No.: US 12,204,203 B2
(45) Date of Patent: Jan. 21, 2025

(54) DISPLAY SWITCHING DEVICE, INFORMATION DISPLAY DEVICE, DISPLAY DEVICE FOR GAME MACHINE, AND SWITCH

(71) Applicant: OMRON Corporation, Kyoto (JP)

(72) Inventors: Masayuki Shinohara, Kyoto (JP); Gouo Kurata, Kyoto (JP); Yuto Mori, Kyoto (JP); Masao Mishina, Kyoto (JP); Yutaka Okayasu, Kyoto (JP); Yasuhito Uetsuji, Kyoto (JP); Hayato Yoshida, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/895,110

(22) Filed: Aug. 25, 2022

(65) Prior Publication Data
US 2023/0109081 A1  Apr. 6, 2023

(30) Foreign Application Priority Data
Sep. 28, 2021  (JP) .................................. 2021-158433

(51) Int. Cl.
*G02F 1/1335* (2006.01)
*G02B 13/00* (2006.01)
*G02F 1/13* (2006.01)

(52) U.S. Cl.
CPC ..... *G02F 1/133601* (2021.01); *G02B 13/009* (2013.01); *G02F 1/1326* (2013.01); *G02F 1/133607* (2021.01)

(58) Field of Classification Search
None
See application file for complete search history.

(56) References Cited

U.S. PATENT DOCUMENTS

| | | | | |
|---|---|---|---|---|
| 5,719,706 | A | * 2/1998 | Masumoto | ........... G02B 3/0062 348/E9.027 |
| 2003/0035220 | A1 | * 2/2003 | Hawver | ................ G02B 30/27 359/619 |
| 2003/0174265 | A1 | * 9/2003 | Sugawara | ............. G02F 1/1336 349/106 |
| 2020/0184762 | A1 | * 6/2020 | Hisaki | ...................... G02B 6/00 |

FOREIGN PATENT DOCUMENTS

| | | | | |
|---|---|---|---|---|
| CN | 111916001 A | * | 11/2020 | ........... G02B 3/0037 |
| JP | 2003-195216 A | | 7/2003 | |
| JP | 2005221619 A | * | 8/2005 | |

* cited by examiner

*Primary Examiner* — Shan Liu
(74) *Attorney, Agent, or Firm* — LEX IP L W GROUP, PLLC; Robert L. Scott, Esq.

(57) ABSTRACT

A display switching device according to one or more embodiments may include a lens array including an array of a plurality of lenses and a display unit. Light from each of the plurality of light source positions transmits through a different position on the display unit and is focused by a corresponding lens. A transmittance on the display unit through which the light transmits differs depending on a position on the display unit. The transmittance at a position of a plurality of positions on the display unit is a transmittance of one of three or more types.

35 Claims, 18 Drawing Sheets

Cross section A    Cross section B

DISPLAY SWITCHING DEVICE, INFORMATION DISPLAY DEVICE, DISPLAY DEVICE FOR GAME MACHINE, AND SWITCH

CROSS-REFERENCE TO RELATED APPLICATION

This application claims priority to Japanese Patent Application No. 2021-158433 filed on Sep. 28, 2021, the contents of which are incorporated herein by reference.

FIELD

The disclosure relates to a display switching device to switch images to be displayed, an information display device including the display switching device, a display device for a game machine, and a switch.

BACKGROUND

Patent Literature 1 describes a backlight display device for automatic viewing of lenticular image cards including an illumination source designed to selectively illuminate individual images formed on lenticular media. In the backlight display device, the illumination source for the display sequentially illuminates images by directing light toward each image through a portion of a lenticular image card including lenticules in accordance with the card viewing distance and the selected viewing angle.

CITATION LIST

Patent Literature

Patent Literature 1: Japanese Unexamined Patent Application Publication No. 2003-195216

SUMMARY

However, challenges may arise in that the device described in Patent Literature 1 uses binary images to be illuminated and thus can have insufficient expression.

One or more embodiments are directed to a display switching device with improved expression.

In response to the above issue, a display switching device according to one or more embodiments is a device for switching display images by switching light illumination from a plurality of light source positions. The device includes a lens array including an array of a plurality of lenses and a display unit. Light from each of the plurality of light source positions transmits through a different position on the display unit and is focused by a corresponding lens in the lens array. A transmittance of the light through the display unit differs depending on a position on the display unit corresponding to at least one predetermined stationary pattern. The transmittance at a position of a plurality of positions on the display unit is a transmittance of one of three or more types.

The above structure may allow the display switching device to transmit light portions from the plurality of light source positions through different positions on the display unit to display the stationary pattern. The transmittance at multiple positions on the display unit is a transmittance of one of three or more types. Thus, the stationary pattern is represented by ternary values or more, which improves the expression of the display switching device.

In the display switching device according to one or more embodiments, the at least one predetermined stationary pattern may include a plurality of predetermined stationary patterns corresponding to the plurality of light source positions, and the transmittance may be a transmittance of one of three or more types at the position of the light on the display unit in correspondence with at least one of the plurality of predetermined stationary patterns.

The above structure may allow at least one of the plurality of stationary patterns that may be displayed by the display switching device to be represented by ternary values or more. Accordingly, the expression of the display switching device may be improved.

In the display switching device according to one or more embodiments, the display unit may include a plurality of pixel portions each including a portion to allow passage of light from a light source position of the plurality of light source positions focused by the corresponding lens in the lens array, and a pixel peripheral portion located at a periphery of each of the plurality of pixel portions. The transmittance in each of the plurality of pixel portions may be set in accordance with the at least one predetermined stationary pattern.

The above structure may set the transmittance in the pixel portion to determine the transmittance of light transmitted through a portion including the pixel portion.

In the display switching device according to one or more embodiments, the transmittance in the pixel peripheral portion may be constant independently of a position on the display unit.

The above structure removes limitation on the position of the pixel peripheral portion affecting light transmitting through the pixel peripheral portion. Accordingly, the design of the display unit may be facilitated.

In the display switching device according to one or more embodiments, a total area of the plurality of pixel portions in the display unit may be 60% or less of a total area of the plurality of pixel portions and the pixel peripheral portion of each of the plurality of pixel portions.

The above structure may reduce the likelihood that stray light leaking from the pixel portions corresponding to other patterns other than the pattern being displayed by the display switching device causes the other patterns to appear lighter.

In the display switching device according to one or more embodiments, an area ratio of an area of a pixel portion, of the plurality of pixel portions, to an area of a unit image portion may be an area ratio of one of three or more types, where the unit image portion includes the pixel portion, of the plurality of pixel portions, including a portion to allow passage of light from a single light source position of the plurality of light source positions focused by a corresponding lens in the lens array and includes the pixel peripheral portion located at the periphery of the pixel portion, and the unit image portion may include one pixel of the at least one predetermined stationary pattern.

The above structure causes the transmittance in the unit image portion to be a transmittance of one of three or more types in accordance with the area ratio of the area of the pixel portion to the area of the unit image portion. Accordingly, the expression of stationary patterns may be improved.

In the display switching device according to one or more embodiments, an intermediate area ratio other than a maximum and a minimum of the types of area ratio may be different from the maximum and the minimum by 10% or greater of a difference between the maximum and the minimum.

The above structure causes the transmittance in the unit image portion, which is an intermediate value other than the maximum and the minimum, to differ from the maximum and the minimum by 10% or greater of the difference between the maximum and the minimum. Accordingly, the difference between pixels in the stationary pattern due to the difference in the transmittance in the unit image portion may be clarified.

In the display switching device according to one or more embodiments, the area ratio may vary as a length of the pixel portion changes in a predetermined first direction parallel to a surface of the display unit.

In the display switching device according to one or more embodiments, in the unit image portion, the pixel portion may have a shape longest in a predetermined second direction parallel to a surface of the display unit and shortest in a predetermined third direction parallel to the surface of the display unit and orthogonal to the second direction.

The above structure increases the changed length by changing the size in the second direction when the same area is changed for the pixel portion. Accordingly, the processing of the display unit may be facilitated.

In the display switching device according to one or more embodiments a plurality of light emitters included in one light source may be arranged in line in a predetermined direction at the single light source position, and the predetermined direction in which the plurality of light emitters are arranged may match the second direction.

The above structure reduces the variation in the transmittance in the unit image portion for each light emitter as compared with when the direction in which the plurality of light emitters are arranged does not match the second direction.

In the display switching device according to one or more embodiments, the unit image portion may extend in a predetermined fourth direction and a predetermined fifth direction, and the fourth direction and the fifth direction may be parallel to the surface of the display portion and may be orthogonal to each other. The second direction may be different from the fourth direction and the fifth direction. The third direction may be different from the fourth direction and the fifth direction.

The above structure increases the size of the pixel portion and the spacing between the pixel portions across the display unit.

In the display switching device according to one or more embodiments, the pixel portion may include a plurality of partial pixel portions spaced from each other in the unit image portion.

The above structure may vary the area ratio of the area of the pixel portion to the area of the unit image portion by causing the number of partial pixel portions to differ between the unit image portions. Accordingly, the design of the display unit may be facilitated.

In the display switching device according to one or more embodiments, a predetermined reference distance may be set with respect to a distance between a center of the display unit and a center of the unit image portion. A maximum of the area ratio in the unit image portion in which the distance is greater than the reference distance may be greater than a maximum of the area ratio in the unit image portion in which the distance is less than the reference distance.

The above structure reduces the variation in the transmittance due to the position of the unit image portion on the display unit.

In the display switching device according to one or more embodiments, a position of a pixel portion, of the plurality of pixel portions, in a unit image portion may be a position of one of three or more types, where the unit image portion includes the pixel portion, of the plurality of pixel portions, including a portion to allow passage of light from a single light source position of the plurality of light source positions focused by a corresponding lens in the lens array and includes the pixel peripheral portion located at the periphery of the pixel portion, and the unit image portion may include one pixel of the at least one predetermined stationary pattern.

The above structure causes an area ratio of the pixel portion to be an area ratio of one of three or more types in a portion in which light enters the unit image portion. Accordingly, the transmittance in the unit image portion may be caused to be a transmittance of one of three or more types, which improves the expression of stationary patterns.

In the display switching device according to one or more embodiments, a difference between a maximum and a minimum of a distance between centers of gravity of two of the pixel portions that are adjacent to each other and included in the unit image portion may be 10% or greater of the maximum.

The above structure clarifies the pixel difference of the stationary pattern due to the difference in the transmittance.

In the display switching device according to one or more embodiments, a combination of a position of the pixel portion and an area ratio of the pixel portion in the unit image portion may be a combination of one of three or more types.

The above structure also improves the expression of stationary patterns.

In the display switching device according to one or more embodiments, an amount of change of the position of the pixel portion may be less than or equal to half of an amount of change of a size of the pixel portion in a direction in which the position of the pixel portion changes.

The above structure reduces crosstalk.

In the display switching device according to one or more embodiments, a distance between at least one lens of the plurality of lenses and the display unit may be different from a focal length of the at least one lens.

The above structure increases the size of the spot of light focused on the display unit as compared with when the distance between each lens and the display unit is equal to the focal length. The area ratio of the pixel portion in the spot is thus varied to vary the transmittance.

In the display switching device according to one or more embodiments, a distance between at least one lens of the plurality of lenses and the display unit may be shorter than a focal length of the at least one lens.

The above structure reduces the likelihood of the spot of light focused on the display unit being oversized.

In the display switching device according to one or more embodiments, the lens array may include a portion in which an average value of a curvature radius of lenses of the plurality of lenses is different in accordance with a distance from a predetermined lens reference position on a lens array surface in which the plurality of lenses are arranged.

In the display switching device according to one or more embodiments, the lens array may include a portion in which the average value of the curvature radius of lenses of the plurality of lenses increases as the distance from the lens reference position on the lens array surface increases.

The above structure reduces the difference in the spot size of light on the display unit focused by the lenses included in the lens array.

In the display switching device according to one or more embodiments, a spot of light focused by the plurality of lenses may have a shape with a length in a predetermined sixth direction parallel to a surface of the display unit longer than a length in a predetermined seventh direction parallel to the surface of the display unit and perpendicular to the sixth direction.

In the display switching device according to one or more embodiments, the lens array may include an anisotropic lens with a focal length in the predetermined sixth direction parallel to the surface of the display unit longer than a focal length in the predetermined seventh direction parallel to the surface of the display unit and perpendicular to the sixth direction.

In the display switching device according to one or more embodiments, a plurality of light emitters included in one light source may be arranged in line in a predetermined direction at each of the plurality of light source positions. The plurality of light emitters may be arranged in the sixth direction.

The above structure reduces the variation in the transmittance in the unit image portion for each light emitter as compared with when the plurality of light emitters are not arranged in the sixth direction.

In the display switching device according to one or more embodiments, the plurality of lenses may include a plurality of sub-lenses.

In the display switching device according to one or more embodiments, the plurality of sub-lenses may be located in a plane portion corresponding to the plurality of lenses.

In the display switching device according to one or more embodiments, the plurality of sub-lenses may be located on a lens surface corresponding to the plurality of lenses.

The above structure may allow the light spot in the display unit to be in a predetermined shape.

In the display switching device according to one or more embodiments, an optical component may be located on a path in which the light enters the lens array from a light source position of the plurality of the light source positions.

The above structure may allow the shape of the spot to be changed on the display unit by the light focused by each lens.

In the display switching device according to one or more embodiments, the optical component may include a diffuser to diffuse the light.

The above structure may increase the size of the spot on the display unit by the light focused by each lens.

In the display switching device according to one or more embodiments, the optical component may include a slit through which a portion of the light transmits.

The above structure reduces the size of the spot on the display unit by the light focused by each lens.

In the display switching device according to one or more embodiments, a transmittance of a material included in the plurality of pixel portions may be a transmittance of one of three or more types.

The above structure may allow the transmittance in the pixel portion to be a transmittance of one of three or more types depending on the materials. Accordingly, the expression of patterns may be improved.

In the display switching device according to one or more embodiments, the plurality of pixel portions may include materials each with a different wavelength distribution of the transmittance.

The above structure may allow the color of each pixel to differ in the pattern, thus improving the expression of the pattern.

In the display switching device according to one or more embodiments transmitted light transmitted through each of the plurality of pixel portions corresponding to the plurality of light source positions may have a different directivity depending on a position on the display unit.

In the display switching device according to one or more embodiments, the transmitted light in each of the plurality of pixel portions corresponding to the plurality of light source positions may have a different diffuseness depending on a position on the display unit.

In the display switching device according to one or more embodiments, the transmitted light in each of the plurality of pixel portions corresponding to the plurality of light source positions may have intensity showing a peak in a direction different depending on a position on the display unit.

The above structure causes the transmittance of light transmitted through the pixel portion to appear different depending on the position on the display unit. Accordingly, the expression of patterns may be improved.

An information display device according to one or more embodiments includes the display switching device according to any one of the above aspects, a plurality of light sources at the plurality of light source positions, and a light emission controller that controls light emission from the plurality of light sources.

The above structure may improve the expression of patterns displayed on the information display device.

A display device for a game machine according to one or more embodiments includes the information display device and a display controller that controls display in the information display device in accordance with a progress of a game.

The above structure may improve the expression of patterns displayed on the display device for a game machine.

A switch according to one or more embodiments includes the display switching device. The switch detects a user operation on the display switching device.

The above structure may improve the expression of patterns that switch in response to the user operation detected by the switch.

The display switching device according to one or more embodiments may improve the expression of images to be displayed.

DETAILED DESCRIPTION

First Embodiment

One or more embodiments will now be described in detail.

Basic Structure of Display Switching Device 10

Figure 1:
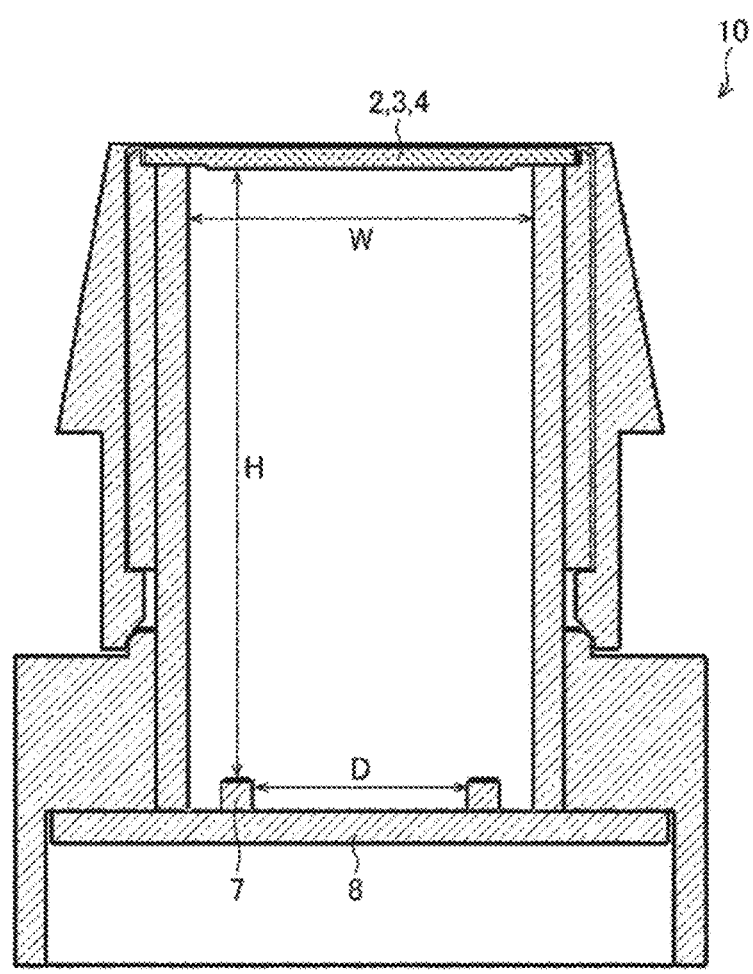
FIG. 1 is a schematic diagram illustrating a switch including a display switching device according to a first embodiment or embodiments, showing a basic structure.
Figure 2:
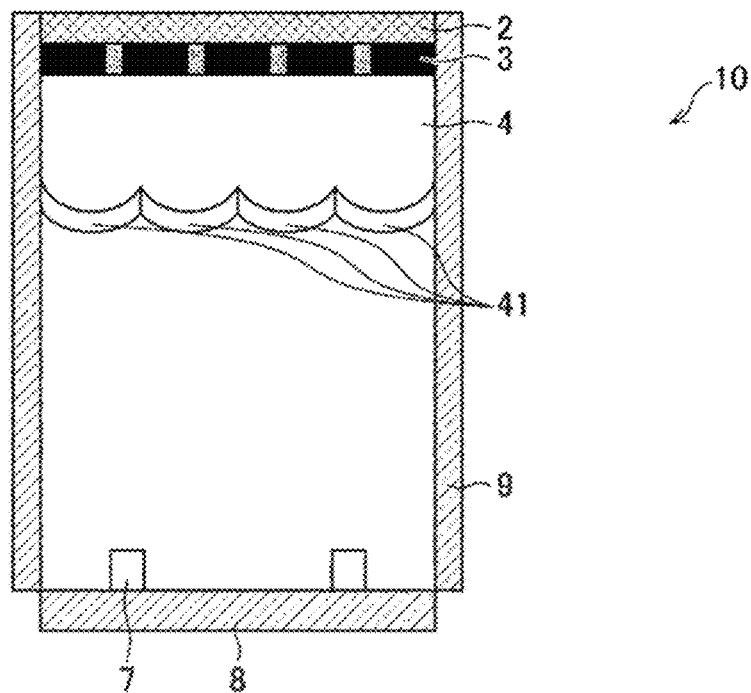
FIG. 2 is a diagram illustrating a display switching device according to a first embodiment or embodiments, showing a detailed structure.

FIG. 1 is a schematic diagram of a switch including a display switching device 10 according to a first embodiment, showing its basic structure. FIG. 2 is a diagram of the display switching device 10, showing its detailed structure. As shown in FIGS. 1 and 2, the display switching device 10 includes a diffusion layer 2, a display unit 3, a lens array 4, multiple light sources 7, and a board 8 in the order from top to bottom in the figures.

The board 8 is a component on which the multiple light sources 7 are mounted. The light sources 7 may be RGB light-emitting diodes (LEDs). The light sources 7 each are located at a predetermined light source position. A distance D between adjacent light sources 7 is, for example, 8 mm. However, the display switching device 10 may not include the light sources 7. In such a case, a user prepares light sources as appropriate.

The lens array 4 focuses light emitted from the multiple light sources 7 mounted on the board 8. The lens array 4 has a thickness of, for example, 0.5 mm. The lens array 4 is an array of multiple lenses 41. The lenses 41 have a pitch of, for example, 0.25 mm. A distance H from each light source 7 to the corresponding lens 41 is, for example, 20 mm.

The display unit 3 transmits light focused by the lens array 4 to display a predetermined stationary pattern. The display of patterns by the display unit 3 will be described later. The display unit 3 may have a thickness less than 0.1 mm.

The diffusion layer 2 diffuses light transmitted through the display unit 3. The diffusion layer 2 may have a thickness less than 0.1 mm. The diffusion layer 2 may have a haze value of 90%.

The display switching device 10 further includes a housing 9 that supports the diffusion layer 2, the display unit 3, and the lens array 4. The housing 9 receives the board 8 on which the multiple light sources 7 are mounted to form the basic structure of the display switching device 10. The housing 9 is, for example, square in a plan view, but is not necessarily limited to a square shape. The housing 9 has a side length W of, for example, 12 mm.

Figure 31:
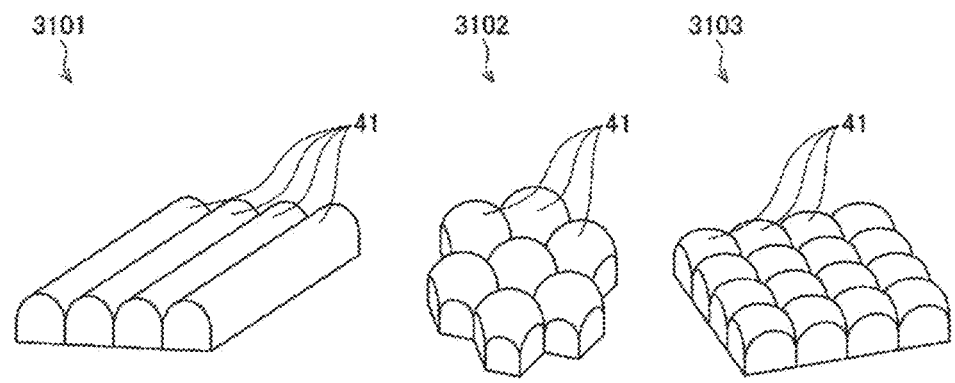
FIG. 31 is a diagram illustrating example arrangements of lenses in a lens array.

FIG. 31 is a diagram showing example arrangements of the lenses 41 in the lens array 4. FIG. 31 shows different example arrangements of the lenses 41 indicated by 3101, 3102, and 3103. For simplicity, some lenses alone are denoted with 41 in the arrangements 3102 and 3103.

The lenses 41 may be arranged in one dimension as in the arrangement 3101. In such a case, the lenses 41 are cylindrical lenses. The lenses 41 may be arranged in two dimensions as in the arrangements 3102 and 3103. More specifically, the lenses 41 may be in a honeycomb as in the arrangement 3102 or in a matrix as in the arrangement 3103.

Figure 3:
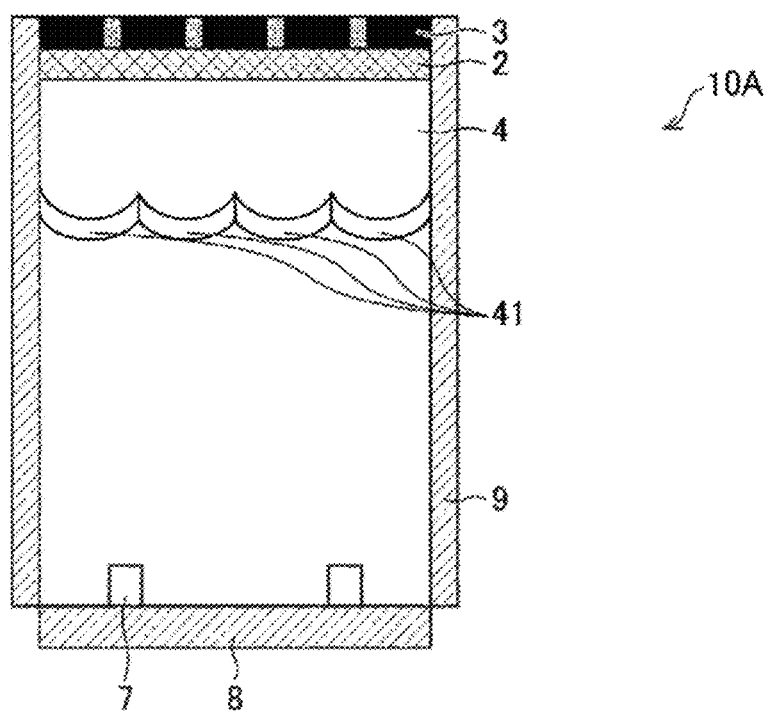
FIG. 3 is a diagram illustrating another display switching device different from a display switching device, such as is shown in FIG. 2, showing a detailed structure.

FIG. 3 is a diagram of a display switching device 10A different from the display switching device 10, showing its detailed structure. As shown in FIG. 3, the display switching device 10A is different in that the diffusion layer 2 is located between the display unit 3 and the lens array 4 instead of above the display unit 3. The display switching device 10A is also included in the present embodiment.

Figure 4:
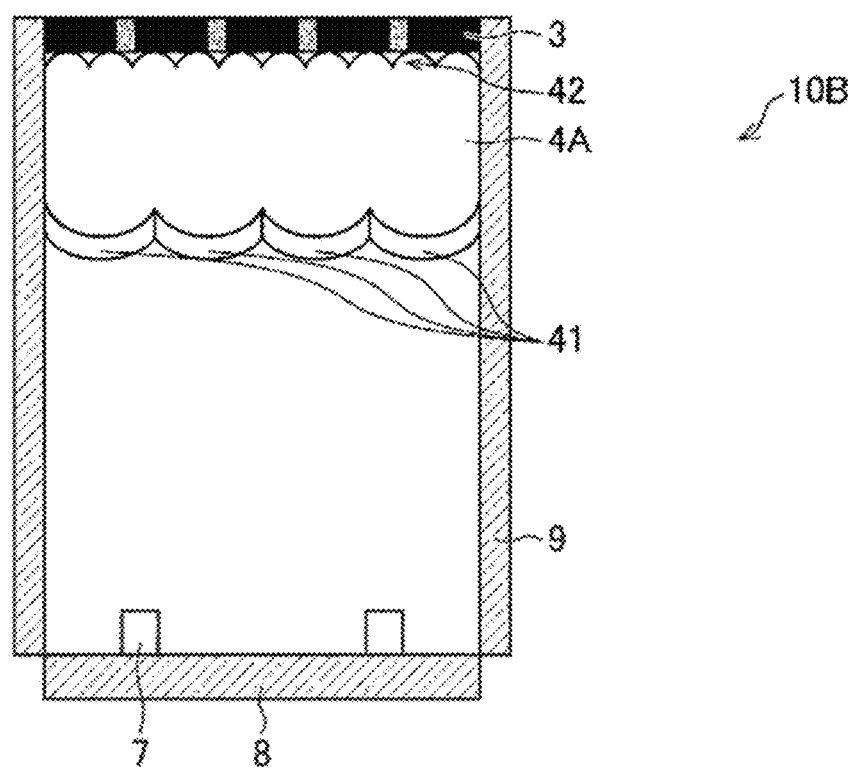
FIG. 4 is a diagram illustrating another display switching device different from a display switching device, such as is shown in FIGS. 2 and 3, showing a detailed structure.

FIG. 4 is a diagram of a display switching device 10B different from the display switching device 10, showing its detailed structure. As shown in FIG. 4, the display switching device 10B is different from the display switching device 10 in that it does not include the diffusion layer 2 and includes a lens array 4A instead of the lens array 4. The lens array 4A includes a diffusion structure 42 that diffuses light and is located on the surface facing the display unit 3. The lens array 4A thus functions as both the lens array 4 and the diffusion layer 2. The display switching device 10B is also included in the present embodiment.

The switch shown in FIG. 1 detects a user operation on the display switching device 10. When, for example, the user performs a depressing operation on the display switching device 10, the switch may detect the operation and switch the lighting of the light sources 7 to switch the pattern displayed by the display switching device 10.

Display of Pattern by Display Unit 3

Figure 5:
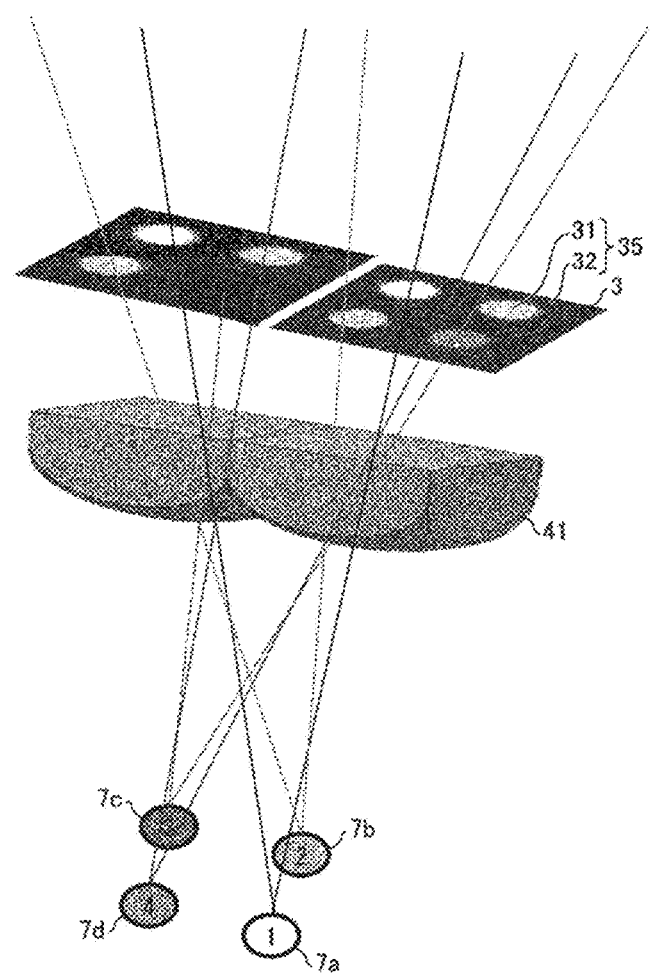
FIG. 5 is a diagram illustrating display of a predetermined pattern by a display unit.

FIG. 5 is a diagram describing display of a predetermined pattern by the display unit 3. As shown in FIG. 5, the display switching device 10 includes light sources 7a, 7b, 7c, and 7d as the light sources 7. Light emitted from the light sources 7a, 7b, 7c, and 7d is focused by the lenses 41 in the lens array 4 to transmit through different positions on the display unit 3. More specifically, the display unit 3 includes multiple unit image portions 35. The unit image portions 35 include multiple pixel portions 31 including portions through which light is focused by the lenses 41 and pixel peripheral portions 32 each located around the corresponding pixel portion 31. The transmittance of light transmitted through the display unit 3 differs depending on the position on the display unit 3 in correspondence with a predetermined pattern. More specifically, the transmittance in each of the pixel portions 31 is set in correspondence with first to fourth patterns. The light sources 7 are switched to emit light to display any of the first to fourth patterns. In other words, multiple predetermined stationary patterns correspond to the positions of the light sources 7a, 7b, 7c, and 7d. The display switching device 10 thus allows the display image to be switched from the first to fourth stationary patterns by switching the light illumination from the light sources 7a, 7b, 7c, and 7d. The transmittance at multiple positions on the display unit 3 can be a transmittance of one of three or more types, which improves the expression of patterns as compared with when the transmittance is a transmittance of one of two types. However, it should be noted that the display unit 3 shown in FIG. 5 is exemplary only, and in other examples, the display unit 3 may not necessarily include multiple unit image portions 35.

In the display switching device 10, different light sources corresponding to different images can simultaneously emit light in different colors to overlay images of different colors. When each unit image portion is small enough or the user views the image far enough away from the display switching device 10, the adjacent unit image portions of different colors mix their colors. The resultant image displayed by the display switching device 10 is viewed in the number $(n^2-1)$ of colors for the number n of light sources of different colors. In addition, when the transmittance of the unit image portion can be a transmittance of one of three or more types, the number of color mixing combinations increases to further increase the number of apparent colors, which further improves the expression. When, for example, red, green, and blue light are emitted from three light sources with the transmittance being a transmittance of one of more types in the images corresponding to the respective light sources, the images can be overlaid to allow a representation similar to a full-color image.

Figure 6:
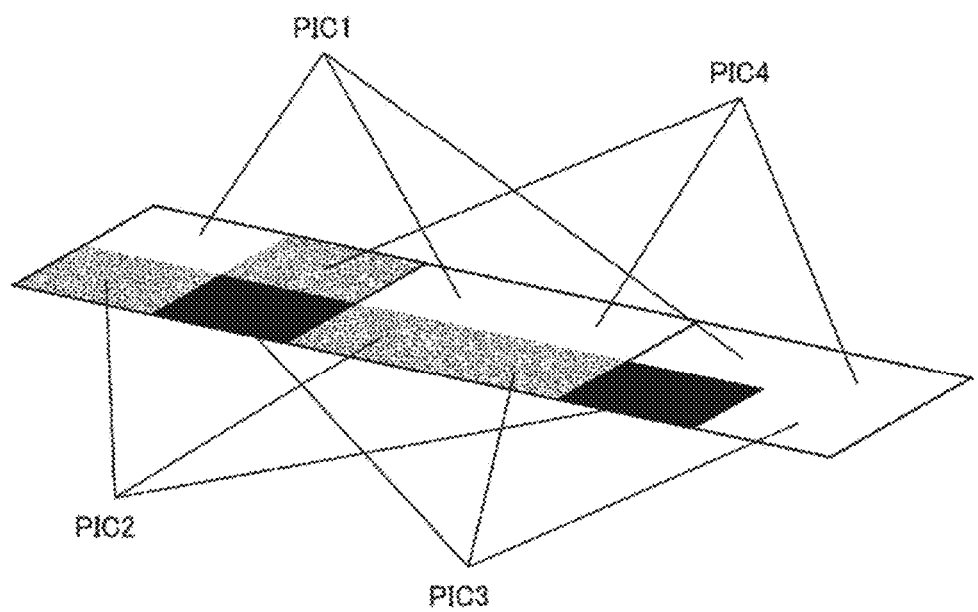
FIG. 6 is a diagram illustrating a portion of an image displayed by a display switching device.

FIG. 6 is a diagram of a portion of an image displayed by the display switching device 10. FIG. 6 shows some pixels in four different images PIC1, PIC2, PIC3, and PIC4. In FIG. 6, the pixel color differences resulting from transmittance differences in the display unit 3 are shown using white, black, and gray.

In FIG. 6, white, black, and gray are included in the pixels in the image PIC3. In other words, the transmittance on the display unit 3 can be a transmittance of one of three types at the position at which light is transmitted in correspondence with the image PIC3. In the display switching device 10, the transmittance on the display unit 3 may thus be a transmittance of one of three or more types at its multiple positions at which light is transmitted in correspondence with at least one of the first to fourth patterns described above, which improves the expression of the pattern having the transmittance to be a transmittance of one of three or more types at the corresponding position on the display unit 3.

The light transmittance in the pixel peripheral portions 32 is constant at any position on the display unit 3. Such constant transmittance removes limitation on the position of the pixel peripheral portion 32 affecting light transmitting through the pixel peripheral portion 32 with respect to light transmitting through the display unit 3. Accordingly, the design of the display unit 3 may be facilitated.

In the display unit 3 in the display switching device 10, the total area of the pixel portions 31 is 60% or less of the total area of the pixel peripheral portions 32 and the pixel portions 31. Arranging the total area accordingly can reduce the likelihood that stray light leaking from the pixel portions 31 corresponding to other patterns other than the pattern being displayed by the display switching device 10, may cause the other patterns to appear lighter.

Figure 7:
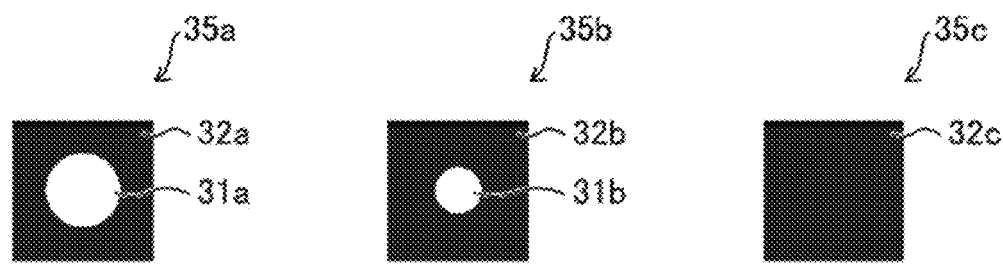
FIG. 7 is a diagram illustrating a plan view of unit image portions in a first embodiment or embodiments.

FIG. 7 is a plan view of unit image portions 35a, 35b, and 35c in a first embodiment. The unit image portions 35a, 35b, and 35c are example unit image portions 35, and each have a different light transmittance. The unit image portion 35a includes a pixel portion 31a and a pixel peripheral portion 32a. The unit image portion 35b includes a pixel portion 31b and a pixel peripheral portion 32b. The unit image portion 35c includes a pixel peripheral portion 32c. The unit image portion 35c includes the pixel portion 31 with the area of zero, although not shown in FIG. 7.

The area ratio of the area of the pixel portion 31a to the area of the unit image portion 35a, the area ratio of the area of the pixel portion 31b to the area of the unit image portion 35b, and the area ratio of the area of the pixel portion 31 to the area of the unit image portion 35c are different from one another. More specifically, the area ratio of the area of the pixel portion 31a to the area of the unit image portion 35a is maximum. The area ratio of the area of the pixel portion 31b to the area of the unit image portion 35b is less than the area ratio of the area of the pixel portion 31a to the area of the unit image portion 35a. The area ratio of the area of the pixel portion 31 to the area of the unit image portion 35c is zero. In the example described below, the area ratio of the area of the pixel portion 31 to the area of the unit image portion 35 may simply be referred to as the area ratio of the pixel portion 31.

In addition to the unit image portions 35a, 35b, and 35c, the display unit 3 may have another unit image portion with a further different area ratio of the pixel portion 31 as the unit image portion 35. In other words, the area ratio of the pixel portion 31 to the area of the unit image portion 35 may be an area ratio of one of three or more types, which improves the expression of patterns by the display switching device 10.

The shape of the pixel portion 31 is not limited to the examples above and below. The pixel portion 31 may be point symmetrical with respect to a predetermined point in the unit image portion 35. The pixel portion 31 with such a shape allows the intensity of light transmitted through the pixel portion 31 to be uniform, thus facilitating the design of the pixel portion 31.

In the type of the area ratio in the unit image portion 35 of the display unit 3, the intermediate area ratio other than the maximum and the minimum may differ from the maximum and the minimum by 10% or greater of the difference between the maximum and the minimum. When, for example, the maximum area ratio is 60%, and the minimum area ratio is 0%, the difference between the maximum and the minimum of the area ratio is 60%. In such a case, the intermediate area ratio may be from 6% to 54% inclusive, which allows the difference in the transmittance of the unit image portions 35 to be clearly visible. When the intermediate area ratio differs by 20% or greater, 30% or greater, or 40% or greater of the difference between the maximum and the minimum of the area ratio, the difference in the transmittance of the unit image portions 35 can be more clearly visible. The minimum area ratio may be greater than 0%. In other words, all the unit image portions 35 may include the pixel portion 31 with the area greater than zero in the display unit 3.

Figure 8:
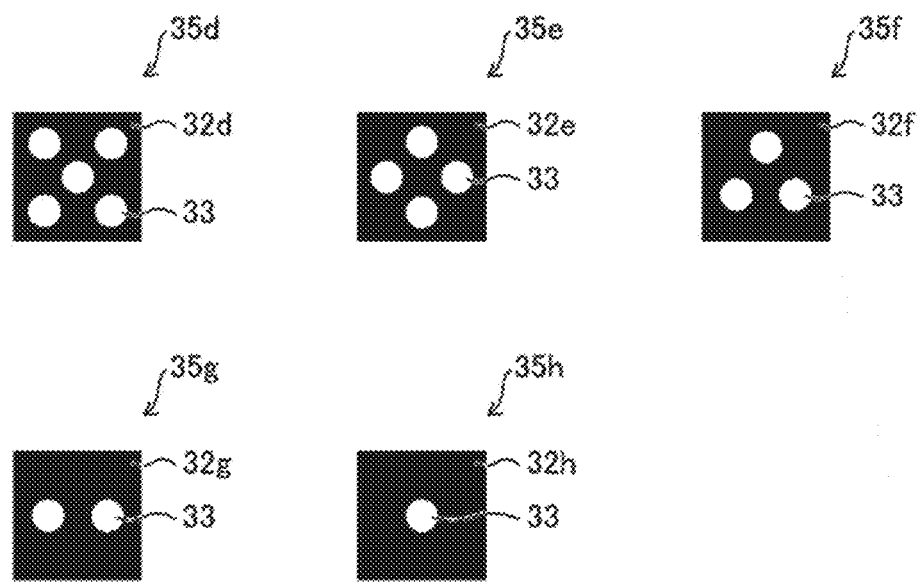
FIG. 8 is a diagram illustrating a plan view of unit image portions in a first embodiment or embodiments.

FIG. 8 is a plan view of unit image portions 35d, 35e, 35f, 35g, and 35h in a first embodiment. The unit image portions 35d, 35e, 35f, 35g, and 35h are example unit image portions 35 with different area ratios of the pixel portions 31, similarly to the unit image portions 35a, 35b, and 35c.

As shown in FIG. 8, the unit image portion 35d includes partial pixel portions 33 and a pixel peripheral portion 32d. The unit image portion 35e includes partial pixel portions 33 and a pixel peripheral portion 32e. The unit image portion 35f includes partial pixel portions 33 and a pixel peripheral portion 32f. The unit image portion 35g includes partial pixel portions 33 and a pixel peripheral portion 32g. The unit image portion 35h includes a partial pixel portion 33 and a pixel peripheral portion 32h.

The number of partial pixel portions 33 differs in each of the unit image portions 35d, 35e, 35f, 35g, and 35h. In the unit image portions 35d, 35e, 35f, 35g, and 35h, the set of the partial pixel portions 33 is the pixel portion 31. In the unit image portion 35, the pixel portion 31 may thus include the multiple partial pixel portions 33 that are spaced from each other. Accordingly, the area ratio of the pixel portion 31 as the entire unit image portion 35 can be varied by varying the number of partial pixel portions 33, which facilitates the design of the display unit 3 as compared with when the shape of the pixel portion 31 is designed for each type of the area ratio of the pixel portion 31.

Figure 9:
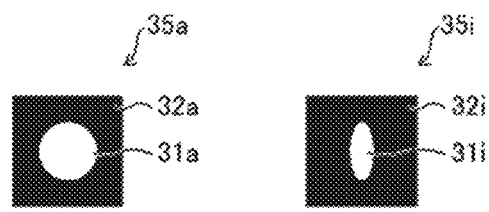
FIG. 9 is a diagram illustrating a plan view of another example unit image portion.

FIG. 9 is a plan view of a unit image portion 35i as another example unit image portion 35. For comparison, FIG. 9 also shows the unit image portion 35a shown in FIG. 7. The unit image portion 35i includes a pixel portion 31i and a pixel peripheral portion 32i. The area ratio of the pixel portion 31a in the unit image portion 35a and the area ratio of the pixel portion 31i in the unit image portion 35i vary as the lengths of the pixel portions 31a and 31i in a predetermined first direction parallel to the surface of the display unit 3 change. In FIG. 9, the first direction is the horizontal direction in the figure.

Figure 10:
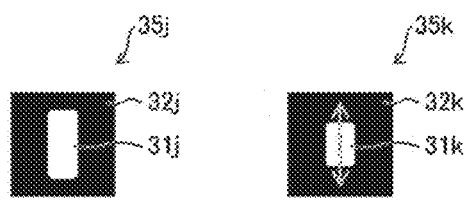
FIG. 10 is a diagram illustrating a plan view of another example unit image portions.

FIG. 10 is a plan view of unit image portions 35j and 35k as another example unit image portion 35. The unit image portion 35j includes a pixel portion 31j and a pixel peripheral portion 32j. The unit image portion 35k includes a pixel portion 31k and a pixel peripheral portion 32k. As shown in FIG. 10, each of the unit image portions 35j and 35k has the longest length in a predetermined second direction parallel to the surface of the display unit 3 and the shortest length in a predetermined third direction parallel to the surface of the display unit 3 and orthogonal to the second direction. The area ratio of the pixel portions 31j in the unit image portion 35j and the area ratio of the pixel portion 31k in the unit image portion 35k vary as the lengths of the pixel portions 31j and 31k change in the second direction in which their lengths are longest. In other words, the first direction described with reference to FIG. 9 matches the second direction shown in FIG. 10. In FIG. 10, the second direction is the vertical direction in the figure, and the third direction is the horizontal direction in the figure. In such a case, the length in the second direction is changed to increase the length when the same area is changed for the pixel portions 31j and 31k, which facilitates the processing of the display unit.

Figure 11:
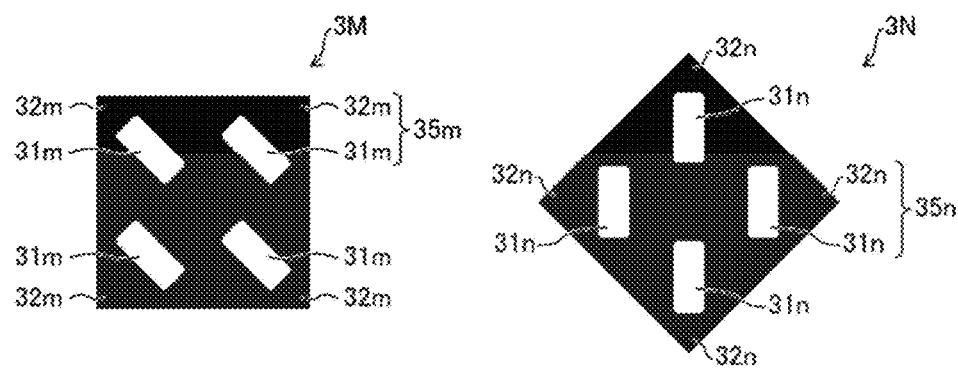
FIG. 11 is a diagram illustrating an arrangements of unit image portions on display units in examples.

FIG. 11 is a diagram showing the arrangements of unit image portions 35m and 35n on display units 3M and 3N as an example display unit 3. In the display unit 3M, the unit image portion 35m includes pixel portions 31m and pixel peripheral portions 32m. In the display unit 3N, the unit image portion 35n includes pixel portions 31n and pixel peripheral portions 32n. Each of the pixel portions 31m and 31n has substantially the same shape as the pixel portion 31j shown in FIG. 10.

The unit image portions 35m are arranged in a predetermined fourth direction, and the unit image portions 35n are arranged in a predetermined fifth direction. The fourth and fifth directions are parallel to the surface of the display unit 3 and orthogonal to each other. As shown in FIG. 11, the second direction in the pixel portions 31m and 31n may differ from the fourth and fifth directions. The third direction in the pixel portions 31m and 31n may differ from the fourth and fifth directions. When, for example, the unit image portion 35 is rectangular, the direction parallel to the diagonal of the rectangle may be the second direction. A rectangular structure increases the size of the pixel portion 31 in the first direction and the spacing between the pixel portions 31 across the display unit 3.

Figure 12:
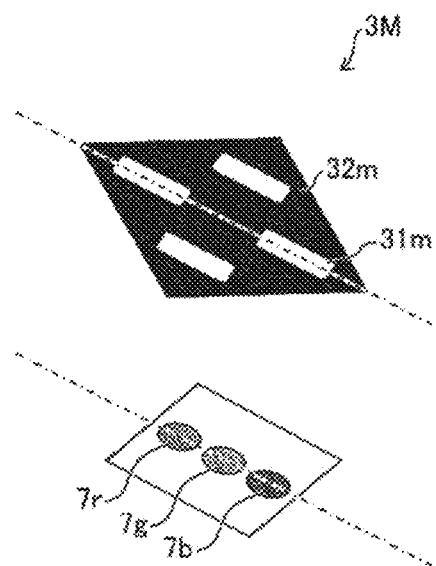
FIG. 12 is a diagram illustrating an arrangement of light-emitting diode (LED) chips when light sources are RGB LEDs.

FIG. 12 is a diagram showing the arrangement of light-emitting diode (LED) chips (light emitters) when the light sources 7 are RGB LEDs. When the light sources 7 are RGB LEDs, the light sources 7 include multiple LED chips 7r, 7g, and 7b. When the display switching device 10 includes the display unit 3M, the direction in which the LED chips 7r, 7g, and 7b are arranged may match the second direction described above. In such a case, the positional displacement of the spot on the display unit 3 by the light emitted from the light emitters due to the positional difference of the multiple light emitters is smaller as compared with when the direction in which the multiple light emitters are arranged does not match the first direction. The above-described structure can reduce the variation in the transmittance in the unit image portion for each light emitter.

Figure 13:
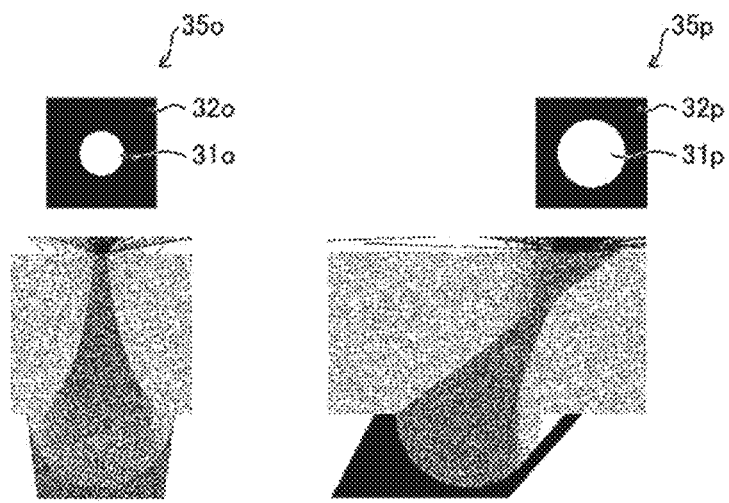
FIG. 13 is a diagram illustrating a difference in a maximum area ratio of a pixel portion in a unit image portion at each position on a display unit.

FIG. 13 is a diagram describing the difference in the maximum area ratio of the pixel portion 31 in the unit image portion 35 at each position on the display unit 3. The size of the spot in the unit image portion 35 increases as the unit image portion 35 is more distant from the center of the display unit 3. In other words, the intensity per unit area of light entering the unit image portion 35 is lower as the unit image portion 35 is more distant from the center of the display unit 3. Thus, the transmittance is lower as the unit image portion 35 is more distant from the center of the display unit 3 for the pixel portion 31 with a constant area ratio.

To reduce the decrease in the transmittance, the maximum of the area ratio of the pixel portion 31 in the unit image portion 35 may vary depending on the position of the unit image portion 35 on the display unit 3. For example, a predetermined reference distance is set for the central distance between the center of the display unit 3 and the center of the unit image portion 35. The maximum area ratio of the pixel portion 31 in the unit image portion 35 in which the central distance is greater than or equal to the reference distance is greater than the maximum area ratio of the pixel portion 31 in the unit image portion 35 in which the central distance is less than the reference distance.

In FIG. 13, a unit image portion 35o is an example unit image portion 35 in which the area ratio of the pixel portion 31 is the maximum when the central distance is less than the reference distance. The unit image portion 35o includes a pixel portion 31o and a pixel peripheral portion 32o. A unit image portion 35p is an example unit image portion 35 in which the area ratio of the pixel portion 31 is the maximum when the central distance is greater than or equal to the reference distance. The unit image portion 35p includes a pixel portion 31p and a pixel peripheral portion 32p.

The area ratio of the pixel portion 31p in the unit image portion 35p is greater than the area ratio of the pixel portion 31o in the unit image portion 35o. The area ratio of the pixel portion 31 in the unit image portion 35 thus determined, reduces the variation in the transmittance due to the position of the unit image portion 35 on the display unit 3.

Second Embodiment

Other embodiments will now be described. For ease of explanation, the components having the same functions as the components described in the above embodiment are given the same reference numerals as those components, and will not be described repeatedly.

Figure 14:
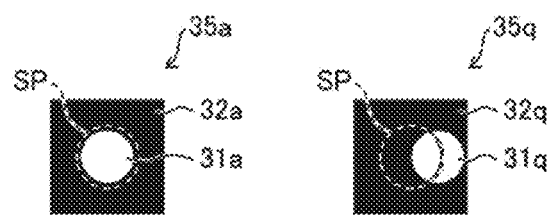
FIG. 14 is a diagram illustrating a plan view of a unit image portion in a second embodiment or embodiments.

FIG. 14 is a plan view of a unit image portion 35q in a second embodiment. For comparison, the unit image portion 35a shown in FIG. 7 is also shown with the unit image portion 35q. The unit image portion 35q includes a pixel portion 31q and a pixel peripheral portion 32q. The position of the pixel portion 31q in the unit image portion 35q differs from the position of the pixel portion 31a in the unit image portion 35a.

The display unit 3 in a second embodiment further includes the unit image portion 35c shown in FIG. 7. The unit image portion 35c includes no pixel portion 31. The position of the pixel portion 31 in the unit image portion 35c can thus differ from any of the position of the pixel portion 31q in the unit image portion 35q and the position of the pixel portion 31a in the unit image portion 35a. In other words, the position of the pixel portion 31 in the unit image portion 35 can be a position of one of three or more types in the display unit 3 in a second embodiment.

FIG. 14 also shows a spot SP of light focused by the lens 41. As shown in FIG. 14, the entire pixel portion 31a is inside the spot SP in the unit image portion 35a. In contrast, the pixel portion 31q is partly outside the spot SP in the unit image portion 35q, which causes the light transmittance to differ in the unit image portions 35a and 35q. The light transmittance in the unit image portion 35c differs from the light transmittance in the unit image portions 35a and 35q. Such a structure can improve the expression of patterns when the display switching device 10 includes the display unit 3 in a second embodiment. Accordingly, the manufacturing efforts may be reduced as compared with an arrangement in which the size or the shape of the pixel portion 31 is varied.

Figure 15:
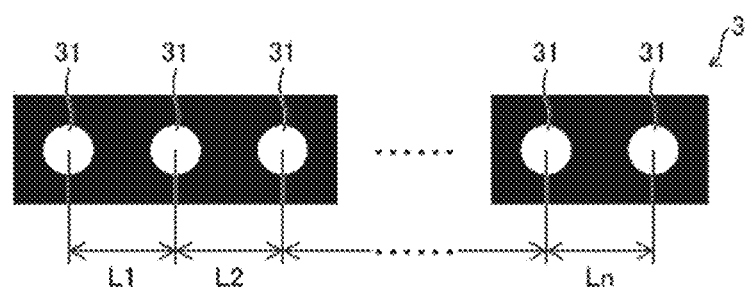
FIG. 15 is a diagram illustrating a distance between a centers of gravity.

FIG. 15 is a diagram describing the distance between the centers of gravity. FIG. 15 shows multiple pixel portions 31 adjacent to each other. Each of the pixel portions 31 is changed from a predetermined reference position in one direction alone when its position in the unit image portion 35 is changed. As shown in FIG. 15, the distance between the centers of gravity of the two pixel portions 31 adjacent to each other is sequentially defined as Lk (k=1, 2, . . . , n). The difference between the maximum and the minimum of the distance between the centers of gravity Lk may be at least 10% or greater of the maximum. Accordingly, the distance between the centers of gravity Lk arranged as described above, allows the difference in the transmittance of the unit image portions 35 due to the different position of the pixel portion 31 to be clearly visible. The difference between the maximum and the minimum of the distance between the centers of gravity Lk may be 20% or greater, 30% or greater, or 40% or greater of the maximum, which allows the difference in the transmittance of the unit image portion 35 to be more clearly visible.

Figure 16:
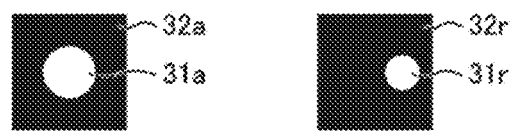
FIG. 16 is a diagram illustrating a plan view of another unit image portion in a second embodiment or embodiments.

FIG. 16 is a plan view of a unit image portion 35r in a second embodiment different from the unit image portion 35q. The unit image portion 35r includes a pixel portion 31r and a pixel peripheral portion 32r. In the unit image portion 35r, the position of the pixel portion 31r differs from the position of the pixel portion 31a in the unit image portion 35a. Further, the area ratio of the pixel portion 31r in the unit image portion 35r differs from the area ratio of the pixel portion 31a in the unit image portion 35a. In the display unit 3, the combination of the area ratio and the position of the pixel portion 31 in the unit image portion 35 may be a combination of one of three or more types.

When both the area ratio and the position of pixel portion 31 are different for each position of the unit image portion 35, the amount of change of the position of the pixel portion 31 may be less than or equal to half of the amount of change of the size of the pixel portion 31 in the direction in which the position of the pixel portion 31 changes. The above described arrangement causes the pixel portion 31 that has changed the position to fall within the range of the pixel portion 31 when the area ratio of the pixel portion 31 is maximum, which reduces crosstalk that causes unintended patterns to be visible due to leakage of light focused on adjacent pixel portions 31. In the distance between the centers of gravity Lk shown in FIG. 15, the difference between the maximum and the minimum may be at least 10% or greater of the maximum in the same manner as when the position of the pixel portion 31 alone is changed.

Third Embodiment

Figure 17:
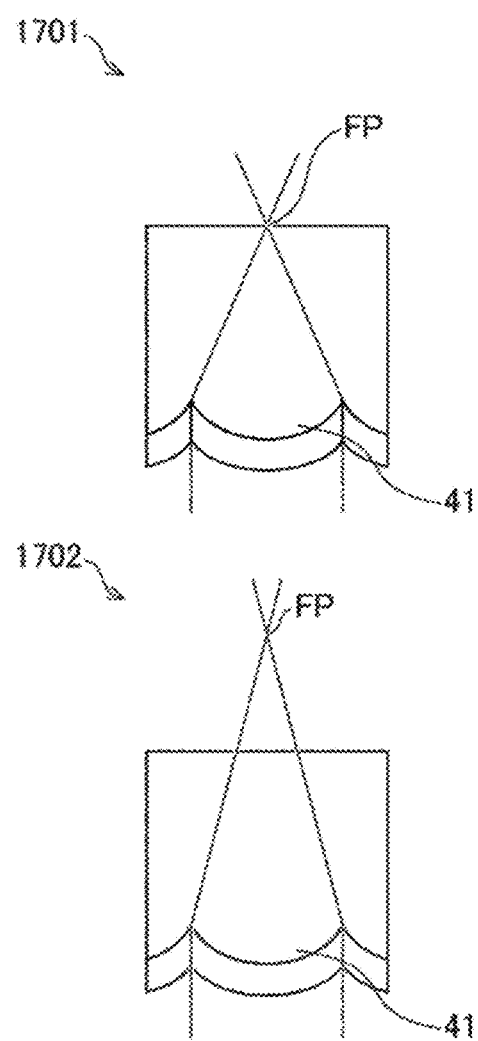
FIG. 17 is a diagram illustrating to describe an example positional relationship between each lens and the display unit in a display switching device.

FIG. 17 is a diagram describing an example positional relationship between the lens 41 and the display unit 3 in the display switching device 10. FIG. 17 includes a portion indicated by 1701 for the distance between the lens 41 and the display unit 3 equal to the focal length of the lens 41, and a portion indicated by 1702 for the distance between the lens 41 and the display unit 3 different from the focal length of the lens 41.

As in the portion 1701, a focal point FP is located on the display unit 3 when the distance between the lens 41 and the display unit 3 is equal to the focal length of the lens 41. In such a case, the size of the spot on the display unit 3 is small. Thus, the transmittance is unlikely to be a transmittance of one of three or more types although the area ratio or the position of the pixel portion 31 differs in the unit image portion 35.

In the display switching device 10, the distance between the lens 41 and the display unit 3 may differ from the focal length of the lens 41 as in the portion 1702. Such a difference allows the transmittance to be a transmittance of one of three or more types by varying the area ratio or the position of the pixel portions 31 in the unit image portion 35.

The distance between the lens 41 and the focal point FP in the direction parallel to the optical axis is not constant with the direction of the light and becomes shorter than the focal length as the lens 41 is more distant from the optical axis. When the distance between the lens 41 and the display unit 3 is longer than the focal length of the lens 41, the spot SP may thus be oversized because the distance between the display unit 3 and the focal point FP is further increased in the direction distant from the optical axis of the lens 41.

As in the portion 1702, at least one of the lenses 41 may thus be located at a distance from the display unit 3 that is shorter than the focal length of the lens 41. Locating the lens 41 in the above-described manner reduces the likelihood of the spot SP being oversized as compared with when the distance between the lens 41 and the display unit 3 is longer than the focal length of the lens 41.

Fourth Embodiment

Figure 18:
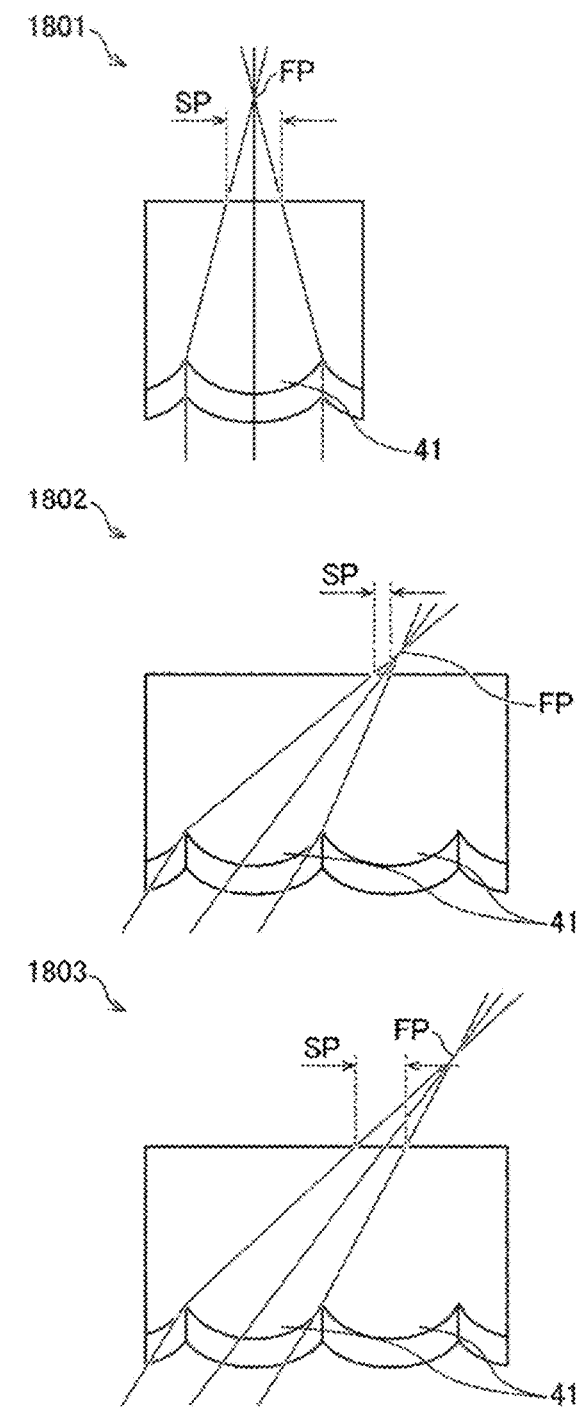
FIG. 18 is a diagram illustrating to describe a positional relationship of a lens and a display unit with a focal point of the lens.

FIG. 18 is a diagram describing the positional relationship of the lens 41 and the display unit 3 with the focal point FP of the lens 41. FIG. 18 includes a portion indicated by 1801 showing the position of the focal point FP in the optical axis direction of the lens 41. As also described in a third embodiment, the distance between the lens 41 and the display unit 3 is shorter than the focal length of the lens 41. The spot SP on the display unit 3 thus has a predetermined size in the optical axis direction of the lens 41.

FIG. 18 further includes a portion indicated by 1802 showing the position of the focal point FP in a direction different from the optical axis direction of the lens 41. Although the lens 41 in the portion 1802 is not identical to the lens 41 in the portion 1801, the same reference numeral is used for simplicity. As also described in a third embodiment, the distance between the lens 41 and the focal point FP in the direction parallel to the optical axis of the lens 41 becomes shorter than the focal length as being more distant from the optical axis of lens 41. When the curvature radius of the lens 41 is constant at any position in the lens array 4, the focal point FP is located on the display unit 3 as in the portion 1802 depending on the position of the lens 41, or the direction in which light enters the lens 41. In such case, the size of the spot SP becomes smaller, which causes difficulty in varying the transmittance depending on the size or the position of the pixel portion 31. The lens array 4 may thus include a portion in which the average value of the curvature radius of the lens 41 is different in accordance with the distance from the predetermined lens reference position on the lens array surface on which the lens 41 is arranged. The reference position is, for example, the center of gravity of the lens array 4.

FIG. 18 includes a portion indicated by 1803 showing the position of the focal point FP in the direction different from the optical axis direction of the lens 41 when the lens array 4 includes a portion in which the average value of the curvature radius of the lens 41 is different. In such a case, as in the portion 1803, the focal point FP is at the position distant from the display unit 3 also in the direction different from the optical axis direction of the lens 41. The spot SP on the display unit 3 thus has a predetermined size.

Figure 19:
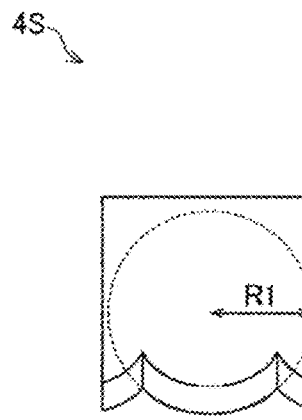
FIG. 19 is a diagram illustrating example lenses.
Figure 19:
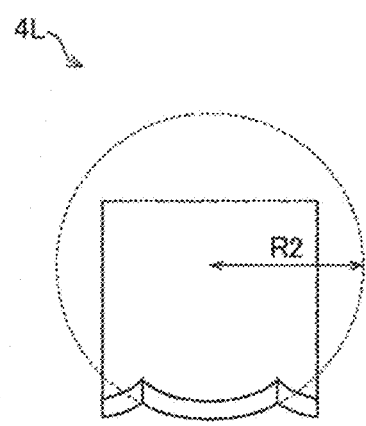

FIG. 19 is a diagram of a lens 4S and a lens 4L as examples of the lens 41. The lens 4S is an example of the lens 41 in the lens array 4, which is located adjacent to the optical axis of the lens 41. The lens 4L is an example of the lens 41 at a position in the lens array 4, which is distant from the optical axis of the lens 41. The lens 4S has a curvature radius R1 less than a curvature radius R2 of the lens 4L. The lens array 4 thus includes a portion in which the average value of the curvature radius of the lenses 41 increases as the distance from the lens reference position on the lens array surface increases.

The lens 41 has such a curvature radius, which reduces the difference in the size of the spot SP of the light focused on the display unit 3 by the lens 41. Such a difference reduces the variation in the transmittance.

Fifth Embodiment

Figure 20:
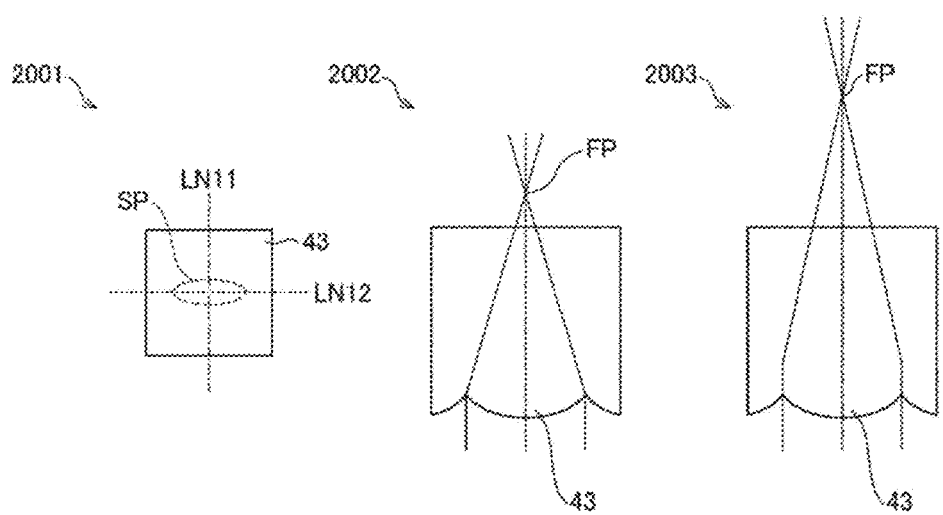
FIG. 20 is a diagram illustrating another example lens.

FIG. 20 is a diagram of a lens 43 as another example of the lens 41. As shown in FIG. 20, the lens 43 is an anisotropic lens. The anisotropic lens has different focal lengths in two mutually orthogonal directions perpendicular to the optical axis direction. FIG. 20 includes a portion indicated by 2001 being a plan view of the lens 43. FIG. 20 includes the portion indicated by 2001 showing the spot SP of the light focused on the display unit 3 by the lens 43. The spot SP has a shape with the length in the direction along a dot-dash line LN12 (sixth direction) longer than its length in the direction along a dot-dash line LN11 (seventh direction).

FIG. 20 includes a portion indicated by 2002 showing the focal point FP in the direction along the dot-dash line LN11 (seventh direction) in the portion 2001. FIG. 20 includes a portion indicated by 2003 showing the focal point FP in the direction along the dot-dash line LN12 (sixth direction) in the portion 2001. As in the portions 2002 and 2003, the focal length in the direction along the dot-dash line LN12 is longer than the focal length in the direction along the dot-dash line LN11. In other words, when the lens array 4 includes anisotropic lenses, the anisotropic lenses are arranged to cause the focal length in the predetermined sixth direction parallel to the surface of the display unit 3 to be longer than the focal length in the predetermined seventh direction parallel to the surface of the display unit 3 and perpendicular to the sixth direction.

Figure 21:
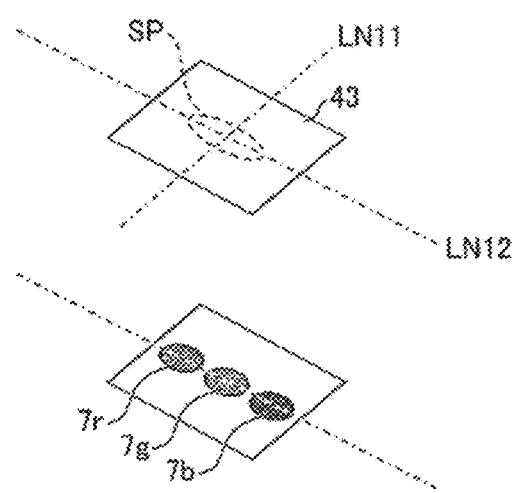
FIG. 21 is a diagram illustrating an arrangement of LED chips when light sources are RGB LEDs.

FIG. 21 is a diagram showing the arrangement of LED chips (light emitters) when the light sources 7 are RGB LEDs. When the light sources 7 are RGB LEDs, the LED chips 7r, 7g, and 7b are arranged in line in a predetermined direction at the positions of the light sources 7 as in the example described with reference to FIG. 12. The LED chips 7r, 7g, and 7b are arranged in the above sixth direction, or in the direction in which the focal length of the anisotropic lens increases. In such a case, the variation in the transmittance in the unit image portion 35 for each of the LED chips 7r, 7g, and 7b can be smaller as compared with when the direction in which the LED chips 7r, 7g, and 7b are arranged does not match the sixth direction.

Sixth Embodiment

Figure 22:
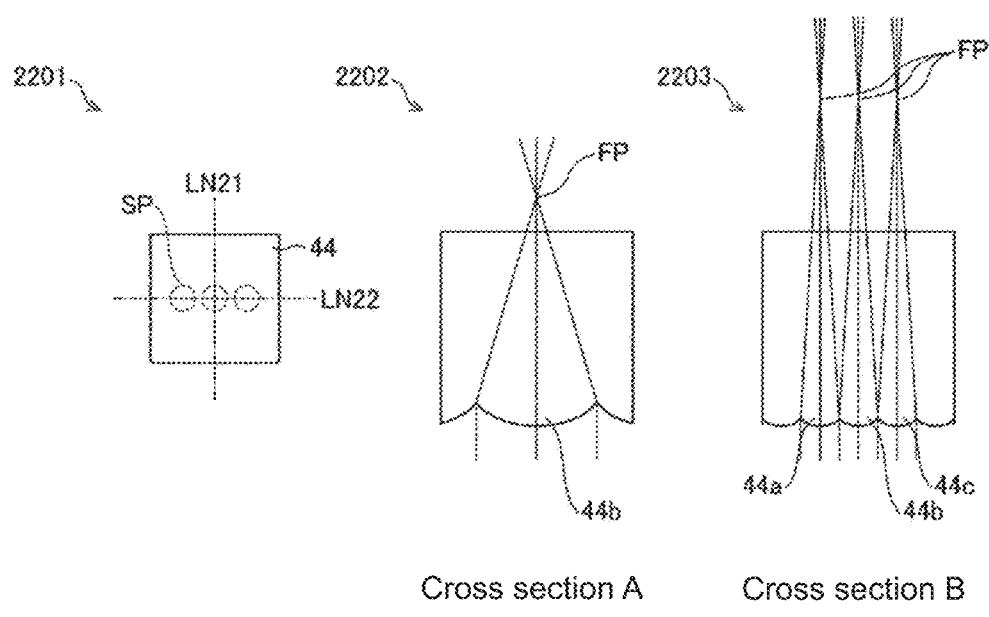
FIG. 22 is a diagram illustrating another example lens.

FIG. 22 is a diagram of a lens 44 as another example of the lens 41. As shown in FIG. 22, the lens 44 includes multiple sub-lenses 44a, 44b, and 44c. The sub-lenses 44a to 44c are formed in a plane portion corresponding to the lens 44.

FIG. 22 includes a portion indicated by 2201 being a plan view of the lens 44. The portion 2201 also shows the spot SP of light focused on the display unit 3 by the lens 44. As in the portion 2201, each of the sub-lenses 44a to 44c has the corresponding spot SP in the lens 44 in a sixth embodiment.

FIG. 22 includes a portion indicated by 2202 showing the focal point FP in the direction along a dot-dash line LN21 in the portion 2201. FIG. 22 includes a portion indicated by 2203 showing the focal points FP in the direction along a dot-dash line LN22 in the portion 2201. The sub-lenses 44a to 44c are arranged in the direction along the dot-dash line LN22. As in the portion 2202, the focal point FP is thus single in the direction along the dot-dash line LN21. In contrast, as in the portion 2203, each of the sub-lenses 44a to 44c has the corresponding focal point FP in the direction along the dot-dash line LN22.

Figure 23:
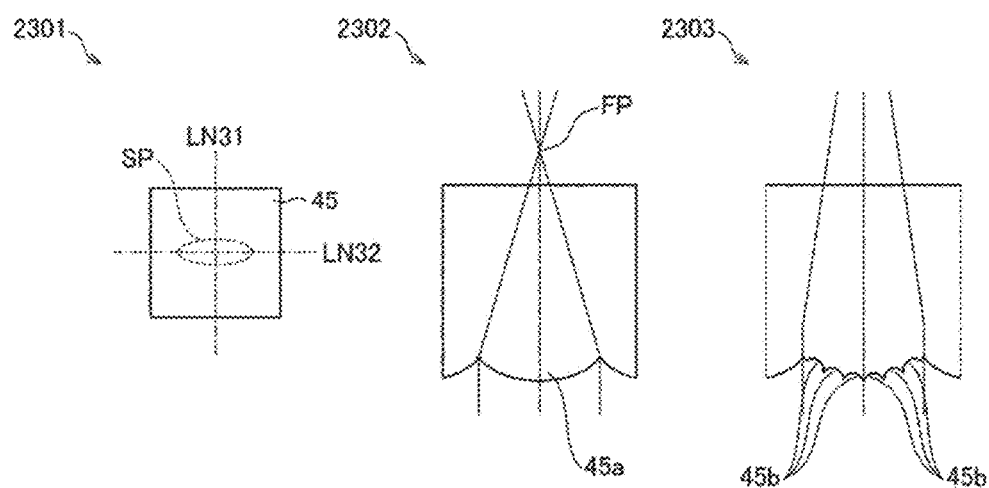
FIG. 23 is a diagram illustrating another example lens.

FIG. 23 is a diagram of a lens 45 as another example of the lens 41. As shown in FIG. 23, the lens 45 includes multiple sub-lenses 45b. The multiple sub-lenses 45b are formed on a lens surface 45a corresponding to the lens 45. The lens surface 45a has a shape of a cutout of a circular lens, such as a spherical lens. Each sub-lens 45b includes a cylindrical concave lens along the lens surface 45a.

FIG. 23 includes a portion indicated by 2302 showing the focal point FP in the direction along a dot-dash line LN31 in the portion 2301. FIG. 23 includes a portion indicated by 2303 showing the focal point FP in the direction along a dot-dash line LN32 in the portion 2301. As in the portion 2302, light entering the lens 45 is focused by the lens surface 45a in the direction along the dot-dash line LN31. As in the portion 2303, light entering the lens 45 is focused by each of the multiple sub-lenses 45b in the direction along the dot-dash line LN32, which allows the lens 45 to be anisotropic.

Seventh Embodiment

Figure 24:
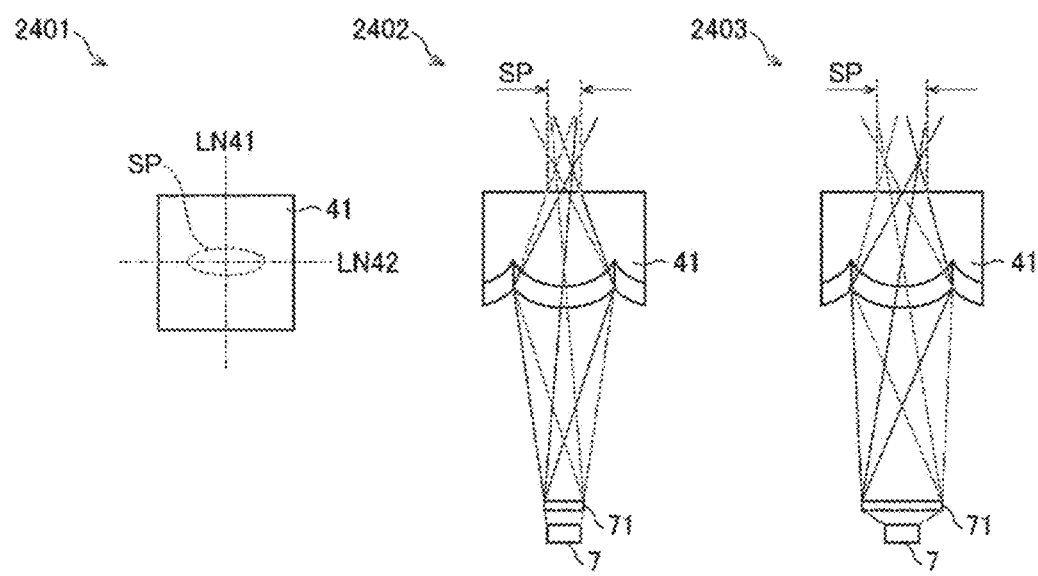
FIG. 24 is a diagram illustrating an example display switching device according to a seventh embodiment or embodiments.
Figure 25:
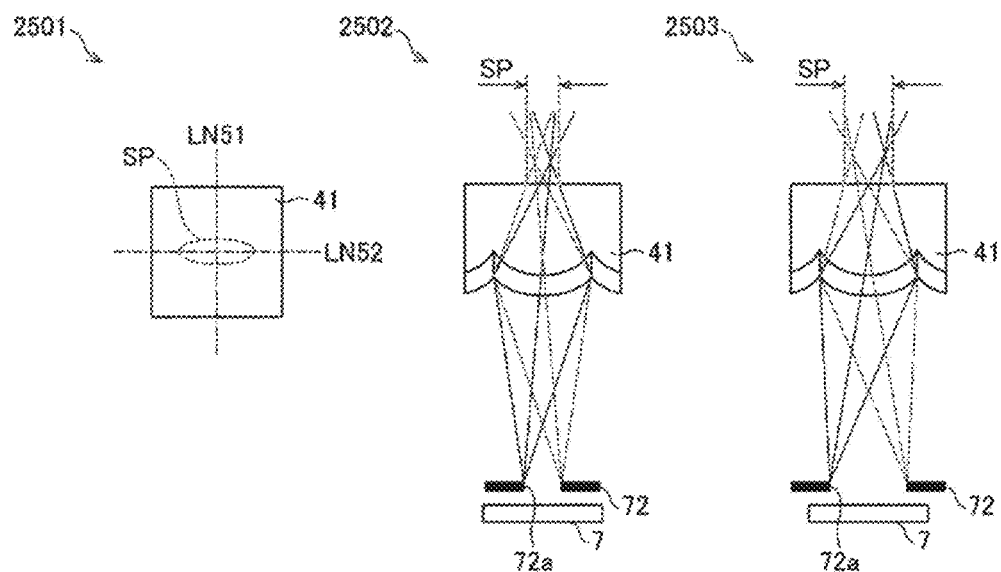
FIG. 25 is a diagram illustrating another example display switching device according to a seventh embodiment or embodiments.

FIG. 24 is a diagram of an example display switching device according to a seventh embodiment. FIG. 25 is a diagram of another example display switching device according to a seventh embodiment. As shown in FIGS. 24 and 25, the display switching device according to a seventh embodiment includes a diffuser 71 or a slit 72, which is an optical component, in addition to the structure of the display switching device 10. The optical component is located on the path in which light enters the lens array 4 from the position of the light source 7. The optical component changes the shape of the spot SP on the display unit 3.

In the example shown in FIG. 24, the optical component is the diffuser 71 that diffuses light. FIG. 24 includes a portion indicated by 2401 showing the shape of the spot SP formed by the lens 41. FIG. 24 includes a portion indicated by 2402 showing the spot SP in the direction along a dot-dash line LN41 in the portion 2401. FIG. 24 includes a portion indicated by 2403 showing the spot SP in the direction along a dot-dash line LN42 in the portion 2401.

As in the portions 2402 and 2403, the diffuser 71 has a shape with the length in the direction along the dot-dash line LN41 shorter than the length in the direction along the dot-dash line LN42. As in the portion 2401, the spot SP thus also has a shape with the length in the direction along the dot-dash line LN41 shorter than the length in the direction along the dot-dash line LN42, which can change the shape of the spot SP in accordance with the shape of the diffuser 71.

In the example shown in FIG. 25, the optical component is, for example, the slit 72 that allows a portion of light to transmit through. FIG. 25 includes a portion indicated by 2501 showing the shape of the spot SP formed by the lens 41. FIG. 25 includes a portion indicated by 2502 showing the spot SP in the direction along a dot-dash line LN51 in the portion 2501. FIG. 25 includes a portion indicated by 2503 showing the spot SP in the direction along a dot-dash line LN52 in the portion 2501.

As in the portions 2502 and 2503, an opening 72a of the slit 72 has a shape with the length in the direction along the dot-dash line LN51 shorter than the length in the direction along the dot-dash line LN52. As in the portion 2501, the spot SP also has a shape with the length in the direction along the dot-dash line LN51 shorter than the length in the direction along the dot-dash line LN52, which can change the shape of the spot SP in accordance with the opening 72a of the slit 72.

Eighth Embodiment

Figure 26:
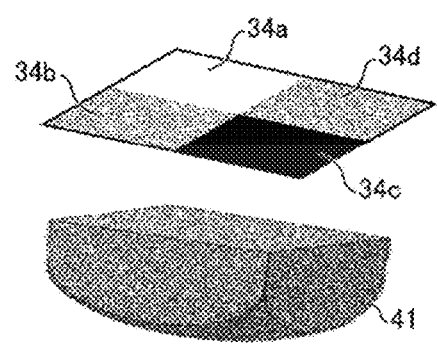
FIG. 26 is a diagram illustrating an example display unit in an eighth embodiment or embodiments.

FIG. 26 is a diagram of an example display unit 3 (refer to, for example, FIG. 1) in an eighth embodiment. For simplicity, FIG. 26 shows pixel portions 34a, 34b, 34c, and 34d alone for the display unit 3. The lens 41 is also shown.

In FIG. 26, the pixel portions 34a to 34d are formed from materials each with a different light transmittance. In the display unit 3, the transmittance of the materials that form the pixel portions 34a to 34d may be a transmittance of one of three or more types as shown in FIG. 26. For example, the transmittance of each of the pixel portions 34a to 34d can be a transmittance of one of three or more types by combining a light absorbing material such as a smoke film, a polarizing material such as a polarizing plate, or a reflecting material such as a half mirror depending on the predetermined transmittance. The display switching device 10 in which the display unit 3 includes these pixel portions 34a to 34d can also improve the expression.

Figure 27:
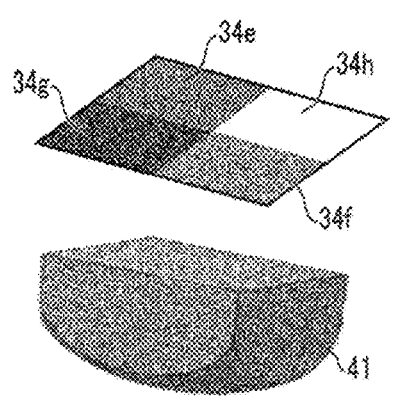
FIG. 27 is a diagram illustrating another example display unit in an eighth embodiment or embodiments.

FIG. 27 is a diagram of another example display unit 3 (refer to, for example, FIG. 1) in an eighth embodiment. For simplicity, FIG. 27 shows pixel portions 34e, 34f, 34g, and 34h alone for the display unit 3. The lens 41 is also shown.

In FIG. 27, the pixel portions 34e to 34h are formed from materials each with a different wavelength distribution of light transmittance. In the display unit 3, the transmittance of each of the materials forming the pixel portions 34e to 34h may have a different wavelength distribution as shown in FIG. 27. More specifically, the transmittance of the red wavelength may be high in the pixel portion 34e, the transmittance of the green wavelength may be high in the pixel portion 34f, and the transmittance of the blue wavelength may be high in the pixel portion 34g. The transmittance of all the wavelengths may be high in the pixel portion 34h. For example, each of the pixel portions 34e to 34h can have a different wavelength distribution by combining colors of resin or colors of ink in accordance with the predetermined wavelength distribution. In the display switching device 10 in which the display unit 3 includes these pixel portions 34e to 34h, the color of the light transmitted through the pixel portion 31 differs depending on the material forming the pixel portion 31, which allows the color of each pixel to differ in the pattern to improve the expression.

Ninth Embodiment

In each of the above embodiments, the directivity of light transmitted through the pixel portion 31 is the same at any position of the pixel portion on the display unit 3. However, in the display switching device 10, the directivity of light transmitted through the pixel portion 31 may differ depending on the position on the display unit 3.

Figure 28:
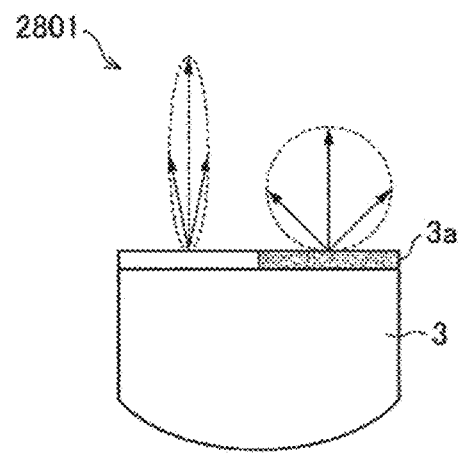
FIG. 28 is a diagram illustrating an example display unit in which a directivity of transmitted light differs depending on a position.
Figure 28:
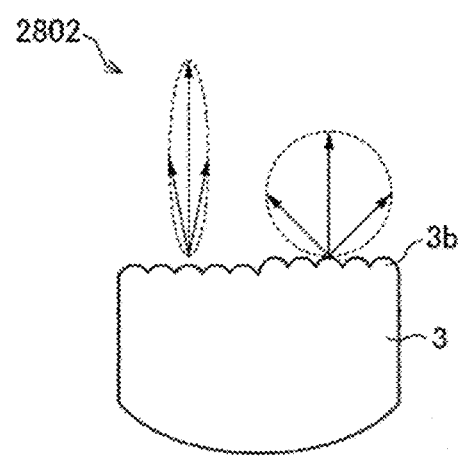
Figure 28:
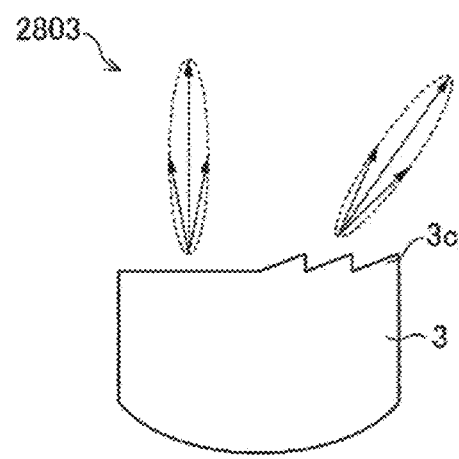

FIG. 28 is a diagram of an example display unit 3 in which the directivity of transmitted light differs depending on the position. In FIG. 28, the directivity of transmitted light is indicated by circles and arrows. In the example indicated by 2801 in FIG. 28, a diffuser 3a is located on a portion of the display unit 3 on its side through which light is transmitted. In the example indicated by 2802 in FIG. 28, a diffusion portion 3b is formed on a portion of the display unit 3 on the side through which light is transmitted.

The diffuser 3a and the diffusion portion 3b change the diffusion of light transmitted through the display unit 3. In the example indicated by 2801 in FIG. 28, the intensity of transmitted light in the direction perpendicular to the display unit 3 decreases, and the intensity of transmitted light in other directions increases in the portion in which the diffuser 3a is arranged as compared with a portion in which the diffuser 3a is not arranged. The same applies to the example indicated by 2802. The diffusivity of light transmitted through the pixel portion 31 may thus differ depending on the position on the display unit 3.

In the example indicated by 2803 in FIG. 28, a directivity changing portion 3c is formed on a portion of the display unit 3 on the side through which light is transmitted. The directivity changing portion 3c changes the directivity of light transmitted through the display unit 3. In the example indicated by 2803 in FIG. 28, the direction in which the intensity of transmitted light indicates a peak is different in the portion in which the directivity changing portion 3c is formed as compared with a portion in which the directivity changing portion 3c is not formed.

The direction in which the intensity of transmitted light indicates a peak may thus differ depending on the position on the display unit 3.

As described above, the directivity of light transmitted through the pixel portion 31 is varied in the display switching device 10 to allow the transmittance of the light transmitted through the pixel portion 31 to appear different when the display switching device 10 is viewed in a specific direction. The display switching device 10 arranged as described can also improve the expression of patterns.

Tenth Embodiment

Figure 29:
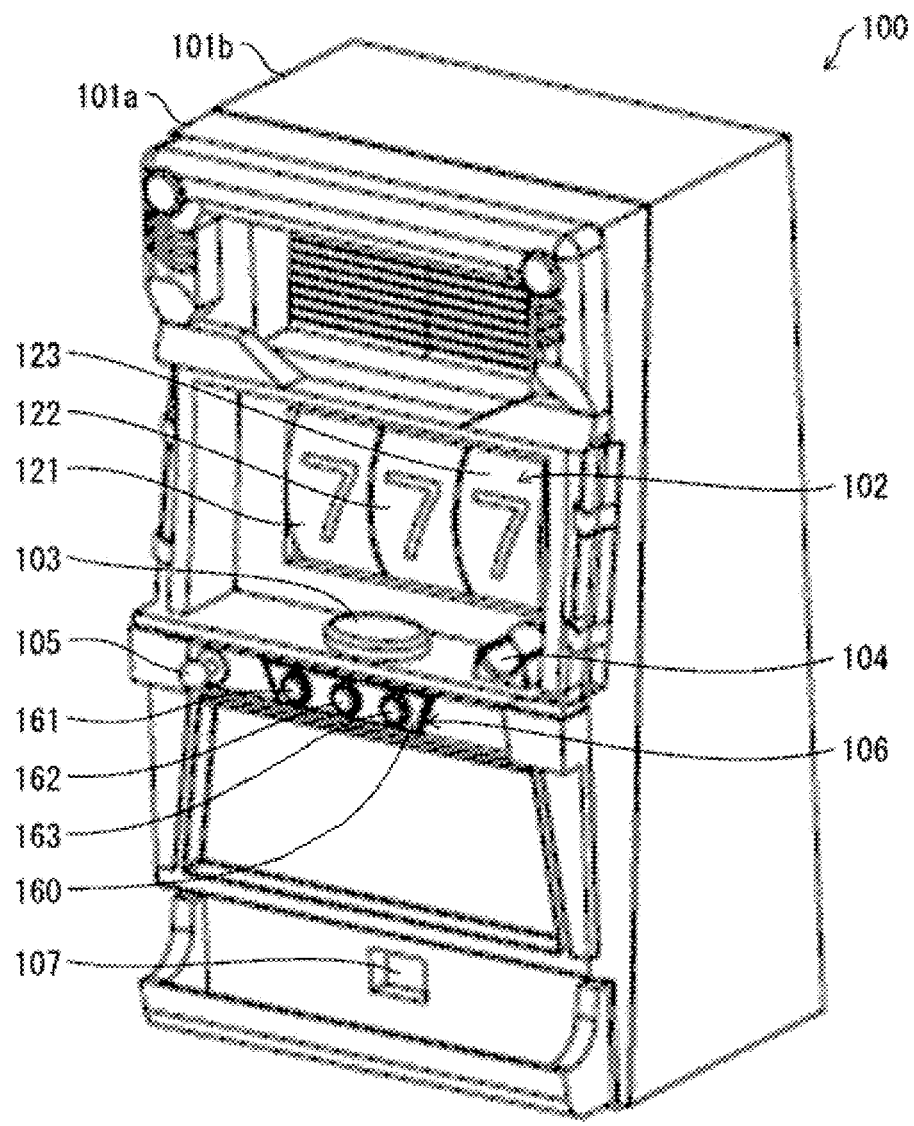
FIG. 29 is a schematic diagram illustrating a perspective view of a display device for a game machine according to a tenth embodiment or embodiments.

FIG. 29 is a schematic perspective view of a display device 100 for a game machine according to a tenth embodiment. As shown in FIG. 29, the display device 100 for a game machine includes a front door 101a facing a player and a box-shaped housing 101b to which the front door 101a is attached for opening or closing. The display device 100 for a game machine also includes a reel unit 102, a bet button 103, a medal slot 104, a start lever 105, a stop button unit 106, and a medal outlet 107. The position of the front door 101a is referred to as the front with respect to the display device 100 for a game machine, the opposite side as the rear, the left side with respect to the front as the left, and the right side as the right.

The reel unit 102 is located in a display window at the middle in the vertical direction of the front door 101a in the housing 101b. The reel unit 102 includes three cylindrical reels 121 to 123 (a left reel 121, a middle reel 122, and a right reel 123) arranged in the lateral direction. The reels 121 to 123 spin or stop in response to an operation performed by the player. The player receives a prize in accordance with the pattern of symbols when all the reels 121 to 123 stop.

The bet button 103 is located substantially at the center of the flat panel of a console below the display window in the front door 101a. The medal slot 104 is located at the right on the flat panel of the console in the front door 101a. The bet button 103 is a button switch used to indicate the number of medals to bet (the number of bets) per game on the display device 100 for a game machine out of the medals placed into the medal slot 104 by the player. For example, the player depresses the bet button 103 the number of times to indicate as many bets as the depressing count.

The start lever 105 is located on the left on the front surface of the console in the front door 101a. In response to an operation on the start lever 105, the reels 121 to 123 start spinning.

The stop button unit 106 is located substantially at the center of the front surface of the console inside the front door 101a. The stop button unit 106 is fixed on the front surface of the console by a decorative panel (front panel) 160. The stop button unit 106 includes three stop buttons 161 to 163 (a left-reel stop button 161, a middle-reel stop button 162, and a right-reel stop button 163) arranged in the lateral direction. When each of the stop buttons 161 to 163 is depressed, the corresponding one of the reels 121 to 123 stops spinning. The structure of the stop button unit 106 will be described in detail later with reference to FIG. 30.

The medal outlet 107 is located in a lower portion of the front door 101a. The display device 100 for a game machine discharges medals through the medal outlet 107.

The stop buttons 161 to 163 each include multiple light sources.

In response to an operation on the start lever 105, a reel spin controller receives an instruction to start spinning the reels 121 to 123. The reel spin controller provides drive pulses to a reel drive controller to spin the reels 121 to 123 at a predetermined speed. The reel drive controller spins the reels 121 to 123 based on the received drive pulses.

The reel spin controller receives, from the photo-microswitches of the stop buttons 161 to 163, signals indicating that the stop buttons 161 to 163 have been depressed. The reel spin controller then provides drive pulses to the reel drive controller to stop the reels 121 to 123. The reel drive controller stops the reels 121 to 123 based on the received drive pulses.

Additionally, a lighting controller controls turning on and off of each of the light sources of the stop buttons 161 to 163.

Overview of Stop Button Unit 106

Figure 30:
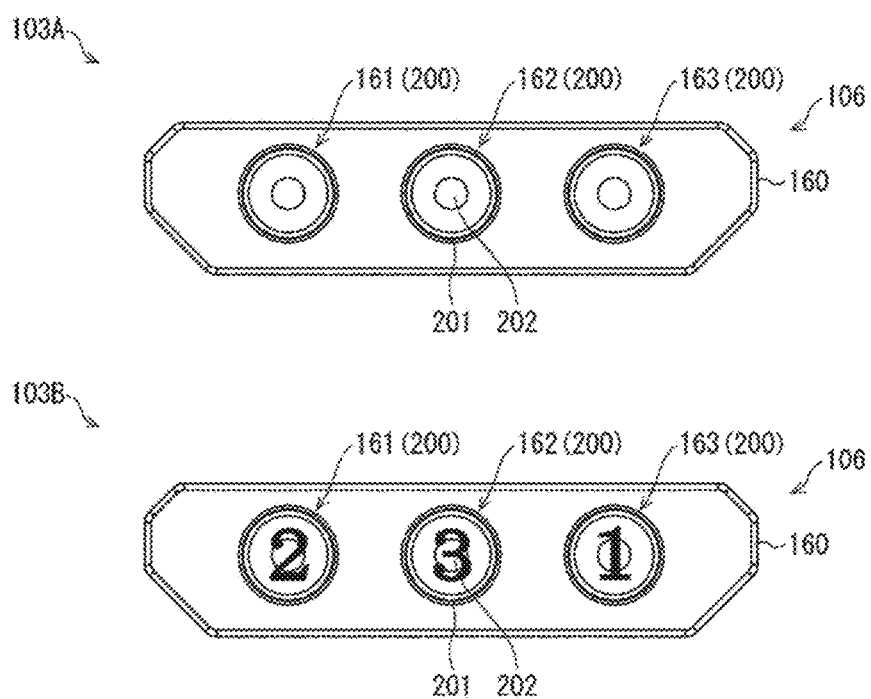
FIG. 30 is a diagram illustrating a schematic top view of a stop button unit.

FIG. 30 is a schematic top view of the stop button unit 106. The schematic structure of the stop button unit 106 installed in the display device 100 for a game machine will now be described.

As shown in FIG. 30, the stop button unit 106 includes the decorative panel 160 and three push button devices 200 as the stop buttons 161 to 163. In other words, the stop buttons 161 to 163 are the three push button devices 200 included in the stop button unit 106. The push button devices 200 will be described below, and the same can apply to all the stop buttons 161 to 163.

As shown in FIGS. 29 and 30, the decorative panel 160 has holes at the respective positions of the three push button devices 200. The push button devices 200 each include a button body (a button top) 201 with the surface depressed with the player's finger. The push button devices 200 each include a display unit (a display switch sheet) 202 that displays a predetermined display image on the rear surface of the button body 201.

FIG. 30 includes a portion indicated by 103A showing the display units 202 displaying no display images. FIG. 30 includes a portion indicated by 103B showing the display units 202 displaying the order in which the stop buttons 161 to 163 are to be depressed as an example of a display image. The display units 202 can thus display predetermined display images for the player through the holes in the decorative panel 160.

The stop button unit 106 is an information display device including, for example, the display switching device 10 described above, the light sources 7, and a light emission controller that controls the light emission from the light sources 7. The display device 100 for a game machine includes the stop button unit 106 and a display controller that controls the display in the stop button unit 106 in accordance with the progress of the game. The stop button unit 106 and the display device 100 for a game machine can represent information to the user with expressive patterns.

The embodiments described herein should not be construed to be restrictive, but may be modified within the spirit and scope. The technical features described in different embodiments may be combined in other embodiments within the technical scope.

The invention claimed is:

1. A display switching device for switching display images by switching light illumination from a plurality of light source positions, the display switching device comprising:
a lens array comprising an array of a plurality of lenses; and
a display unit, wherein
light from each of the plurality of light source positions transmits through a different position on the display unit and is focused by a corresponding lens in the lens array,
a transmittance of the light through the display unit differs depending on a position on the display unit corresponding to at least one predetermined stationary pattern based on the plurality of light source positions,
an assignment of the plurality of light source positions is switched by the display switching device such that the at least one predetermined stationary pattern is changed to another predetermined stationary pattern corresponding to the switched assignment of the plurality of light source positions,
the transmittance at a position of a plurality of positions on the display unit is a transmittance of one of three or more types,
the display unit comprises
a plurality of pixel portions each comprising a portion to allow passage of light from a light source position of the plurality of light source positions focused by the corresponding lens in the lens array, and
a pixel peripheral portion located at a periphery of each of the plurality of pixel portions,
the transmittance in each of the plurality of pixel portions is set in accordance with the at least one predetermined stationary pattern,
an area ratio of an area of a pixel portion, of the plurality of pixel portions, to an area of a unit image portion is an area ratio of one of three or more types, where the unit image portion comprises the pixel portion, of the plurality of pixel portions, comprising a portion to allow passage of light from a single light source position of the plurality of light source positions focused by a corresponding lens in the lens array and comprises the pixel peripheral portion located at the periphery of the pixel portion, and the unit image portion comprises one pixel of the at least one predetermined stationary pattern, and
an intermediate area ratio other than a maximum and a minimum of the types of area ratio is different from the maximum and the minimum by 10% or greater of a difference between the maximum and the minimum.

2. The display switching device according to claim 1, wherein
the at least one predetermined stationary pattern comprises a plurality of predetermined stationary patterns corresponding to the plurality of light source positions, and
the transmittance is a transmittance of one of three or more types at the position of the light on the display unit in correspondence with at least one of the plurality of predetermined stationary patterns.

3. The display switching device according to claim 1, wherein
the transmittance in the pixel peripheral portion is constant independently of a position on the display unit.

4. The display switching device according to claim 1, wherein
a total area of the plurality of pixel portions in the display unit is 60% or less of a total area of the plurality of pixel portions and the pixel peripheral portion of each of the plurality of pixel portions.

5. The display switching device according to claim 1, wherein
the area ratio varies as a length of the pixel portion changes in a predetermined first direction parallel to a surface of the display unit.

6. The display switching device according to claim 1, wherein
in the unit image portion, the pixel portion has a shape longest in a predetermined second direction parallel to a surface of the display unit and shortest in a predetermined third direction parallel to the surface of the display unit and orthogonal to the second direction.

7. The display switching device according to claim 6, wherein
a plurality of light emitters comprised in one light source is arranged in line in a predetermined direction at the single light source position, and
the predetermined direction in which the plurality of light emitters is arranged matches the second direction.

8. The display switching device according to claim 7, wherein
the unit image portion extends in a predetermined fourth direction and a predetermined fifth direction, and the fourth direction and the fifth direction are parallel to the surface of the display portion and are orthogonal to each other,
the second direction is different from the fourth direction and the fifth direction, and
the third direction is different from the fourth direction and the fifth direction.

9. The display switching device according to claim 1, wherein
in the unit image portion, the pixel portion comprises a plurality of partial pixel portions spaced from each other.

10. The display switching device according to claim 1, wherein
a predetermined reference distance is set with respect to a distance between a center of the display unit and a center of the unit image portion, and
a maximum of the area ratio in the unit image portion in which the distance is greater than the reference distance is greater than a maximum of the area ratio in the unit image portion in which the distance is less than the reference distance.

11. The display switching device according to claim 1, wherein
a position of a pixel portion, of the plurality of pixel portions, in a unit image portion is a position of one of three or more types, where the unit image portion comprises the pixel portion, of the plurality of pixel portions, comprising a portion to allow passage of light from a single light source position of the plurality of light source positions focused by a corresponding lens in the lens array and comprises the pixel peripheral portion located at the periphery of the pixel portion, and the unit image portion comprises one pixel of the at least one predetermined stationary pattern.

12. The display switching device according to claim 11, wherein
a difference between a maximum and a minimum of a distance between centers of gravity of two of the pixel portions that are adjacent to each other and comprised in the unit image portion is 10% or greater of the maximum.

13. The display switching device according to claim 11, wherein
a combination of a position of the pixel portion and an area ratio of the pixel portion in the unit image portion is a combination of one of three or more types.

14. The display switching device according to claim 13, wherein
an amount of change of the position of the pixel portion is less than or equal to half of an amount of change of a size of the pixel portion in a direction in which the position of the pixel portion changes.

15. The display switching device according to claim 1, wherein
a distance between at least one lens of the plurality of lenses and the display unit is different from a focal length of the at least one lens.

16. The display switching device according to claim 15, wherein
a distance between at least one lens of the plurality of lenses and the display unit is shorter than a focal length of the at least one lens.

17. The display switching device according to claim 1, wherein
the lens array comprises a portion in which an average value of a curvature radius of lenses of the plurality of lenses is different in accordance with a distance from a predetermined lens reference position on a lens array surface in which the plurality of lenses are arranged.

18. The display switching device according to claim 17, wherein
the lens array comprises a portion in which the average value of the curvature radius of lenses of the plurality of lenses increases as the distance from the lens reference position on the lens array surface increases.

19. The display switching device according to claim 1, wherein
a spot of light focused by the plurality of lenses has a shape with a length in a predetermined sixth direction parallel to a surface of the display unit longer than a length in a predetermined seventh direction parallel to the surface of the display unit and perpendicular to the sixth direction.

20. The display switching device according to claim 19, wherein
the lens array comprises an anisotropic lens with a focal length in the sixth direction longer than a focal length in the seventh direction.

21. The display switching device according to claim 20, wherein
a plurality of light emitters comprised in one light source are arranged in line in a predetermined direction at each of the plurality of light source positions, and
the plurality of light emitters are arranged in the sixth direction.

22. The display switching device according to claim 1, wherein
the plurality of lenses comprise a plurality of sub-lenses.

23. The display switching device according to claim 22, wherein
the plurality of sub-lenses are located in a plane portion corresponding to the plurality of lenses.

24. The display switching device according to claim 22, wherein
the plurality of sub-lenses are located on a lens surface corresponding to the plurality of lenses.

25. The display switching device according to claim 1, wherein
an optical component is located on a path in which the light enters the lens array from a light source position of the plurality of the light source positions.

26. The display switching device according to claim 25, wherein
the optical component comprises a diffuser to diffuse the light.

27. The display switching device according to claim 25, wherein
the optical component comprises a slit through which a portion of the light transmits.

28. The display switching device according to claim 1, wherein
a transmittance of a material comprised in the plurality of pixel portions is a transmittance of one of three or more types.

29. The display switching device according to claim 28, wherein
the plurality of pixel portions comprises materials each with a different wavelength distribution of the transmittance.

30. The display switching device according to claim 1, wherein
transmitted light transmitted through each of the plurality of pixel portions corresponding to the plurality of light source positions has a different directivity depending on a position on the display unit.

31. The display switching device according to claim 30, wherein
the transmitted light in each of the plurality of pixel portions corresponding to the plurality of light source positions has a different diffuseness depending on a position on the display unit.

32. The display switching device according to claim 30, wherein
the transmitted light in each of the plurality of pixel portions corresponding to the plurality of light source positions has intensity showing a peak in a direction different depending on a position on the display unit.

33. An information display device, comprising:
the display switching device according to claim 1;
a plurality of light sources at the plurality of light source positions; and
a light emission controller configured to control light emission from the plurality of light sources.

34. A display device for a game machine, the display device comprising:
the information display device according to claim 33; and
a display controller configured to control display in the information display device in accordance with a progress of a game.

35. A switch, comprising:
the display switching device according to claim 1, wherein the switch detects a user operation on the display switching device.

* * * * *

UNITED STATES PATENT AND TRADEMARK OFFICE
CERTIFICATE OF CORRECTION

| | | |
|---|---|---|
| PATENT NO. | : 12,204,203 B2 | Page 1 of 1 |
| APPLICATION NO. | : 17/895110 | |
| DATED | : January 21, 2025 | |
| INVENTOR(S) | : Masayuki Shinohara et al. | |

It is certified that error appears in the above-identified patent and that said Letters Patent is hereby corrected as shown below:

On the Title Page

Item (74) should read:
METROLEX IP LAW GROUP, PLLC; Robert L. Scott, Esq

Signed and Sealed this
Fourth Day of March, 2025

Coke Morgan Stewart
*Acting Director of the United States Patent and Trademark Office*